Figure 1:
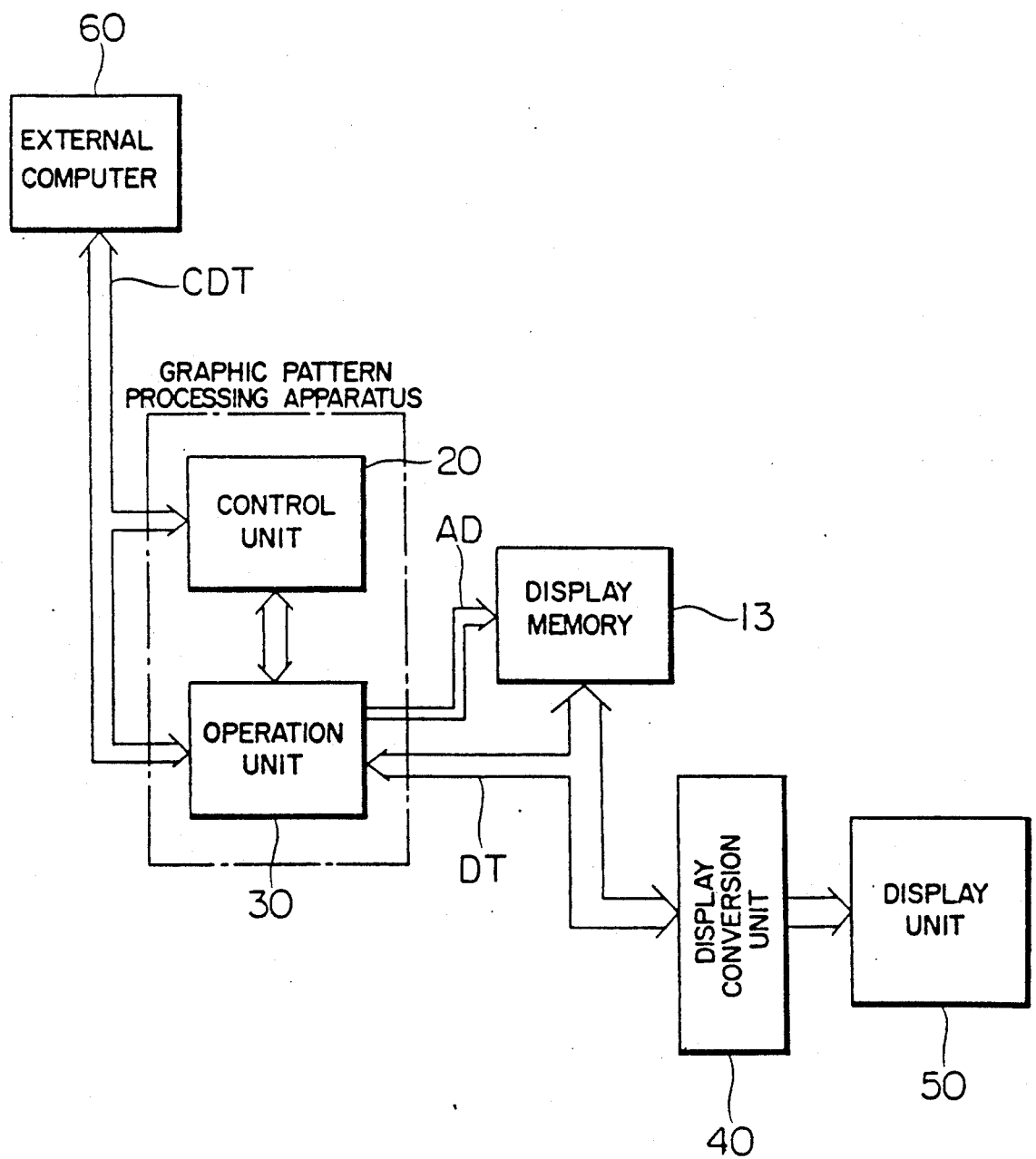

United States Patent [19]

Katsura et al.

[11] Patent Number: 5,043,713

[45] Date of Patent: Aug. 27, 1991

[54] GRAPHIC DATA PROCESSING APPARATUS FOR PROCESSING PIXELS HAVING A NUMBER OF BITS WHICH MAY BE SELECTED

[75] Inventors: Koyo Katsura; Hideo Maejima; Hisashi Kajiwara, all of Hitachi, Japan

[73] Assignees: Hitachi, Ltd.; Hitachi Engineering Co., Ltd., both of Tokyo, Japan

[21] Appl. No.: 350,254

[22] Filed: May 11, 1989

Related U.S. Application Data

[63] Continuation of Ser. No. 686,059, Dec. 24, 1984, Pat. No. 4,862,150.

[30] Foreign Application Priority Data

Dec. 26, 1983 [JP] Japan .................................. 58-246986
Feb. 17, 1984 [JP] Japan .................................. 59-27155
Jun. 14, 1984 [JP] Japan .................................. 59-120679

[51] Int. Cl.$^5$ .............................................. G09G 5/36
[52] U.S. Cl. .................................... 340/747; 340/744; 364/521
[58] Field of Search ............... 340/701, 703, 732, 744, 340/747, 798, 799; 364/521, 522

[56] References Cited

U.S. PATENT DOCUMENTS

| | | | |
|---|---|---|---|
| 4,121,283 | 10/1978 | Walker | 340/703 |
| 4,509,043 | 4/1985 | Mossaides | 340/703 |
| 4,639,879 | 1/1987 | Chaya | 340/744 |
| 4,667,305 | 5/1987 | Dill et al. | 340/799 |

Primary Examiner—Jeffery A. Brier
Attorney, Agent, or Firm—Antonelli, Terry, Stout & Kraus

[57] ABSTRACT

A graphic data processing apparatus is disclosed for accessing a memory which stores pixels having a number of bits which may be selected. Gaphic data is generated with one or more bits per pixel with a plurality of pixels of data being stored in one word of the memory. A physical address operation unit stores information of a current drawing point including a memory address of a word in the memory and a pixel address defining a position of a pixel in one word specified by the memory address. A data operation unit modifies a particular pixel having a number of bits which may be selected in the one word specified by the pixel address in accordance with a drawing instruction.

9 Claims, 22 Drawing Sheets

FIG. 7

| # | FUNCTION | 47-42 | 41-40 | 39-33 | 32-30 | 29-27 | 26-24 | 23-18 | 17-12 | 11 | 10-9 | 8 | 7-4 | 3-2 | 1-0 |
|---|---|---|---|---|---|---|---|---|---|---|---|---|---|---|---|
| 0 | FIFO CONTROL | RV | RW/RU | FUNCA | SFT | ADFL | AC | ADF-H | FLAG | V | FIFO | | | | |
| 1 | LITERAL | | RW | | | | | | LITERAL | | | LC | | | |
| 2 |  | RV | RW/RU | FUNCA | SFT | ADFL | AC | ADF-H | FLAG | V | FF | | | | |
| 3 | FLIP-FLOP CONTROL | | RW | | | | | | FLAG | RU | | | | | |
| 4 | CONDITIONAL COMMAND CONTROL | RV | RW/RU | FUNCA | SFT | ADFL | FUNCB | ECD | FLAG | RU | | S MC DR | | | |
| 5 |  | | RW | | | | | BCD | FLAG | RU | | | | | |
| 6 | CONDITIONAL BRANCH CONTROL | RV | RW/RU | FUNCA | SFT | ADFL | FUNCB | BCD | FLAG | RU | | | BC | RB | |
| 7 |  | | RW | | | | | | | | | | | | |

SFT (bits 29-27):
| 29 | 28 | 27 |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

Figure 2:
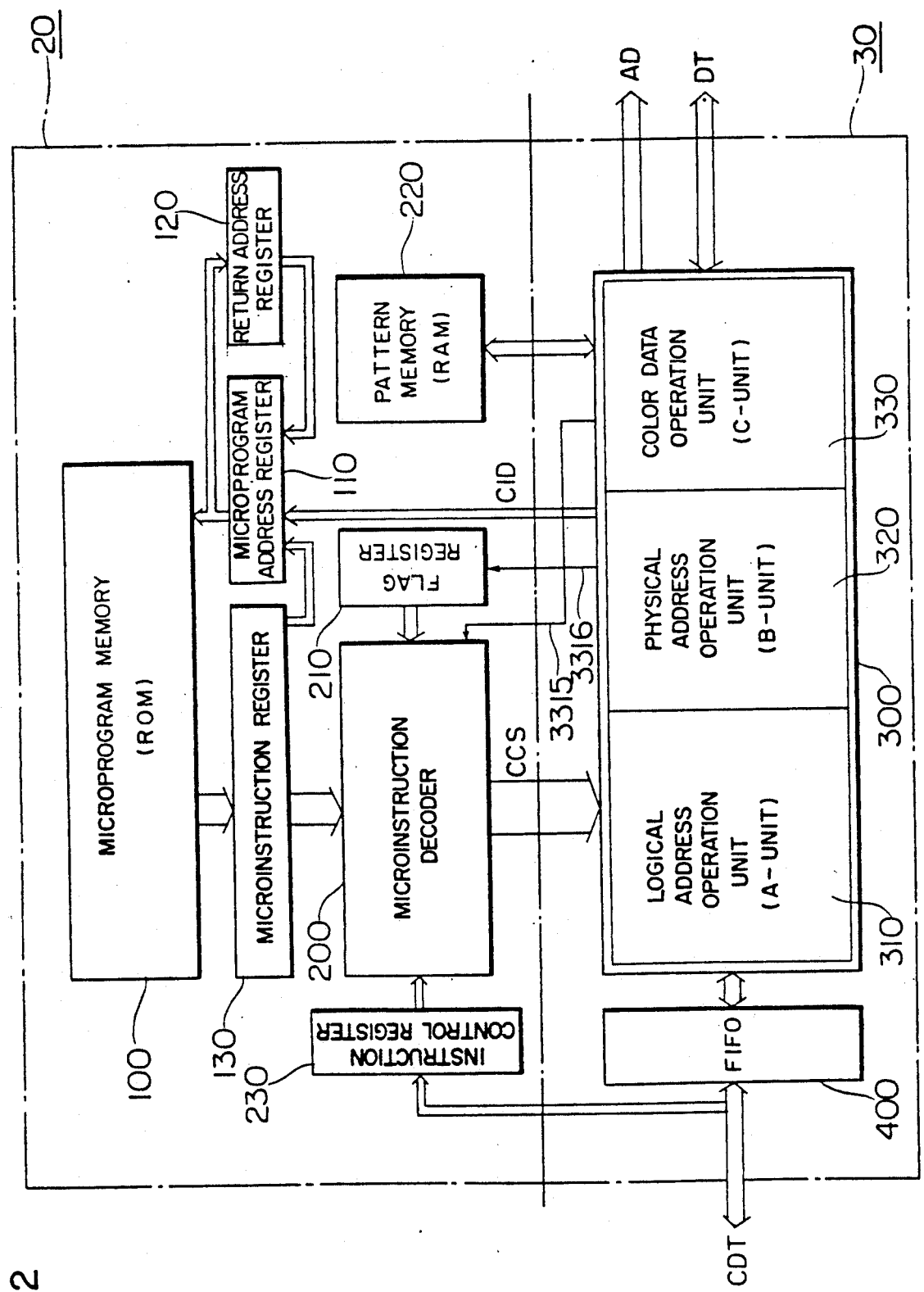
Figure 4:
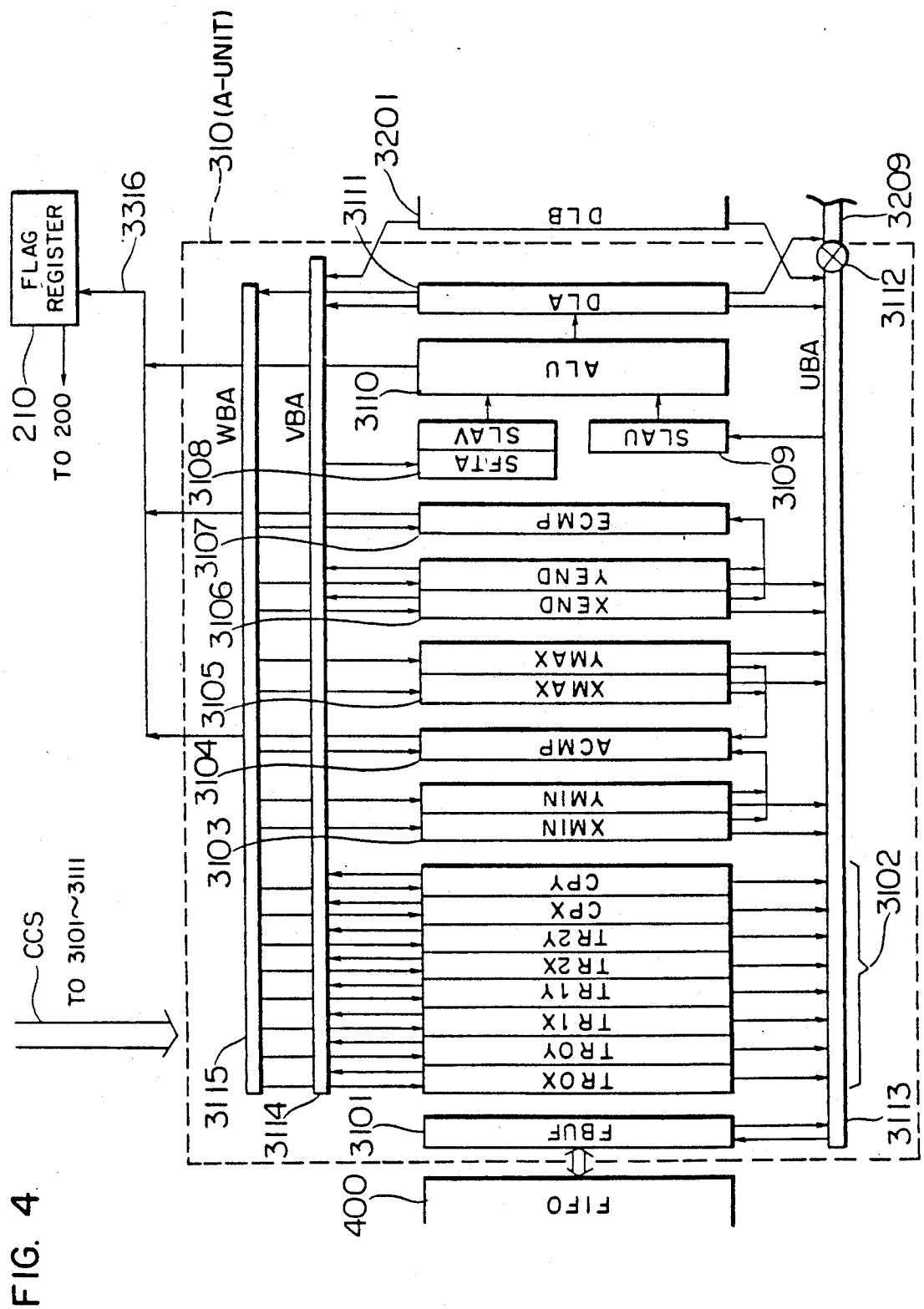

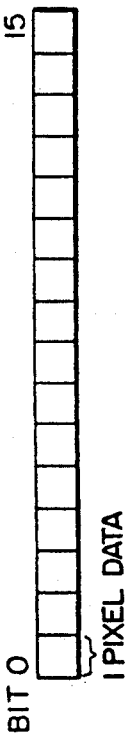
FIG. 8a  1 BIT/PIXEL MODE (GBM=000)
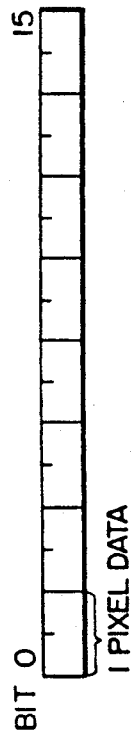
FIG. 8b  2 BITS/PIXEL MODE (GBM=001)
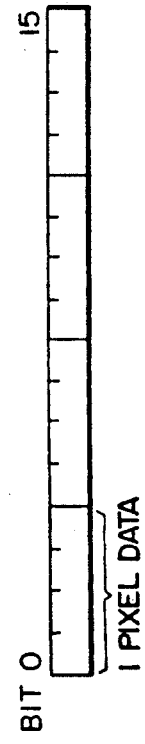
FIG. 8c  4 BITS/PIXEL MODE (GBM=010)
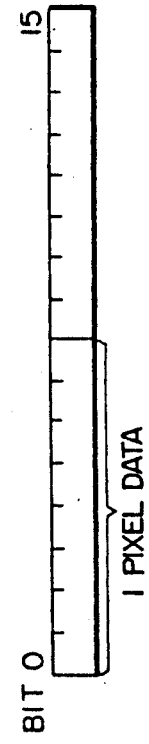
FIG. 8d  8 BITS/PIXEL MODE (GBM=011)
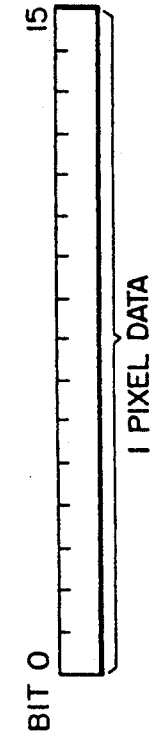
FIG. 8e  16 BITS/PIXEL MODE (GBM=100)
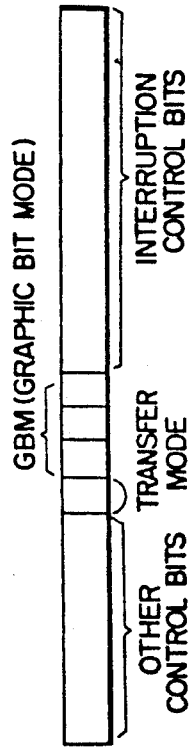
FIG. 8f  INSTRUCTION CONTROL REGISTER (230)

1 BIT/PIXEL MODE
(GBM=000)

2 BITS/PIXEL MODE
(GBM=001)

4 BITS/PIXEL MODE
(GBM=010)

8 BITS/PIXEL MODE
(GBM=011)

16 BITS/PIXEL MODE
(GBM=100)

FIG. 15
| NO. BITS PER PIXEL \ BIT NUMBER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 | 15 |
| 2 | 0 | | 2 | | 4 | | 6 | | 8 | | 10 | | 12 | | 14 | |
| 4 | 0 | | | | [4] | | | | 8 | | | | 12 | | | |
| 8 | 0 | | | | | | | | 8 | | | | | | | |
| 16 | 0 | | | | | | | | | | | | | | | |
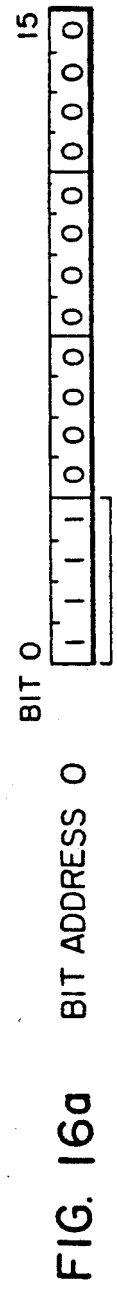
FIG. 16a  BIT ADDRESS 0
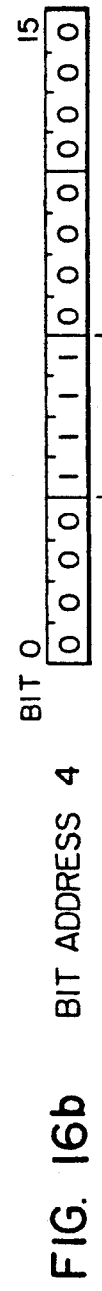
FIG. 16b  BIT ADDRESS 4
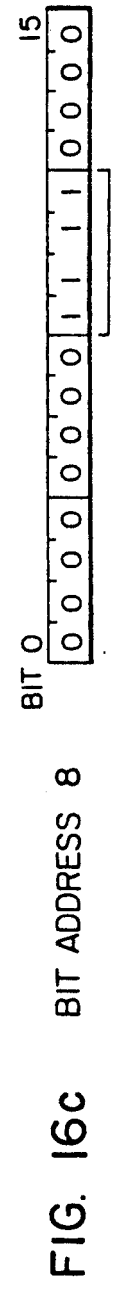
FIG. 16c  BIT ADDRESS 8
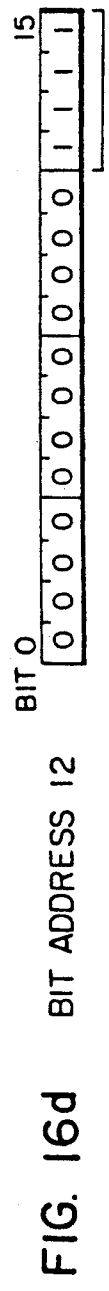
FIG. 16d  BIT ADDRESS 12

|  | LOGICAL ADDRESS | PHYSICAL ADDRESS |
|---|---|---|
| Y P→ X | X ← X + 1<br>Y ← Y | PA ← PA + n |
| Y ↑P X | X ← X<br>Y ← Y + 1 | PA ← PA − MW |
| Y ←P X | X ← X − 1<br>Y ← Y | PA ← PA − n |
| Y P↓ X | X ← X<br>Y ← Y − 1 | PA ← PA + MW |

| BITS/PIXEL \ n | 1 | 2 | 4 | 8 | 16 |
|---|---|---|---|---|---|
| n | 1 | 2 | 4 | 8 | 16 |

ONE-PIXEL TRANSFER MODE

MULTI-PIXEL TRANSFER MODE

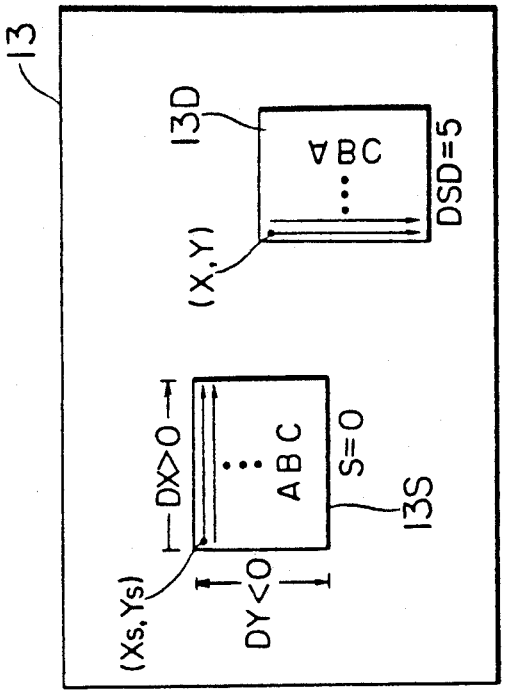
FIG. 26
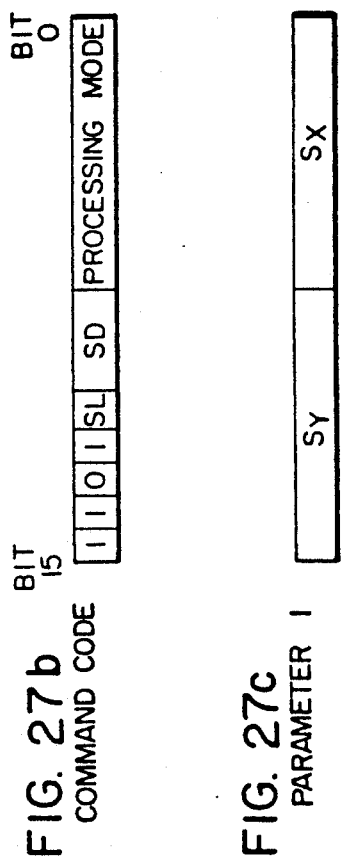
FIG. 27b COMMAND CODE
FIG. 27c PARAMETER 1
FIG. 25a COMMAND CODE
FIG. 25b PARAMETER 1
FIG. 25c PARAMETER 2
FIG. 25d PARAMETER 3
FIG. 25e PARAMETER 4
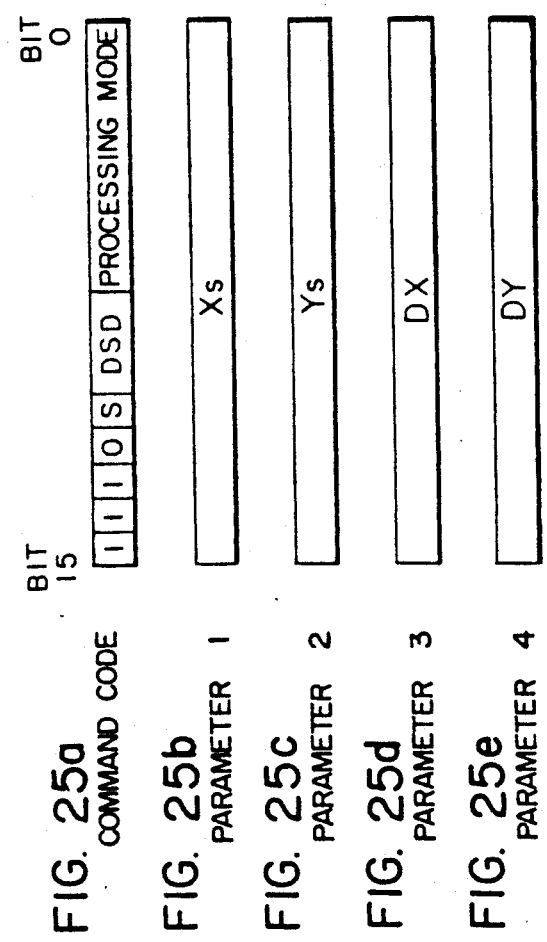
FIG. 27a

GRAPHIC DATA PROCESSING APPARATUS FOR PROCESSING PIXELS HAVING A NUMBER OF BITS WHICH MAY BE SELECTED

This is a divisional application of U.S. Ser. No. 686,039, filed Dec. 24, 1984 now U.S. Pat. No. 4,862,150.

The present invention relates to a high speed image processing apparatus having microprocessors for inputting and outputting data, collecting data and displaying a graphic pattern in a raster scan type CRT display and having a drawing function controlled by a microprogram stored in a microprogram memory.

Most of prior art CRT controllers control only the display function and have no drawing function (see, for example, U.S. Pat. No. 4,149,264). A graphic processing apparatus which achieves a graphic processing function using an integrated circuit has been known but it merely processes monochromatic graphic pattern data representing each pixel by one bit. However, as the information processing system becomes more and more complex, the image processing for a multi-color or multi-tone image is frequently required and a processing speed for such processing is now posing a problem. For example, when image data is to be updated in the multi-color (n-color) or multi-tone (n-tone) processing, the same image processing is repeated n times, or when a one-bit one pixel is to be displayed the image processing is repeated n times. Accordingly, the processing time is n times as long as that for the binary image processing. One processing apparatus may be provided for each of n display memories but this leads to increase the scale and the complexity and increase a burden to a central processing unit.

Assume a drawing process in which a line in an X-Y coordinate space having an origin is drawn between two points $P_S(X_S, Y_S)$ and $P_E(X_E, Y_E)$. A gradient of the line is calculated based on the coordinates of the two points and coordinates of points on the line are calculated. Thus, the graphic pattern data for each point is prepared and stored. The above process is sequentially carried out for all points on the line. Since the calculated coordinates are different information than the memory addresses of the display memory in which the graphic pattern data are to be written, the calculated coordinates (logical addresses) must be translated to the display memory addresses (physical addresses). Since each word of the display memory includes one or more pixel data, the calculated logical address is translated into two physical addresses, first to the display memory address, and second to a bit address representing a pixel position.

In order to translate the logical address to the physical address, the physical address of the origin point and the horizontal size of the display memory must be known. Since the logical address (X, Y) represents a relative position to the origin point, the physical address can be calculated by adding to or subtracting from the physical address of the origin point a product of the horizontal size of the display memory multiplied by Y, in the vertical (Y) direction, and a quotient of the logical address X divided by the number of pixels in one word, in the horizontal (X) direction. A residue produced when the logical address X is divided by the number of pixels in one word is used as a bit address. In this manner, the physical address for processing the graphic pattern data is obtained.

However, in the past, the calculation of the logical address and the translation to the physical address were done by a software program. Accordingly, when a general purpose microprocessor is used, several to several tens microseconds are required to store one pixel data in the display memory, and a high speed processing is not achieved.

In graphic pattern processing apparatus which generates a graphic display data, the graphic display data is transferred in the display memory. A processing speed thereof is now posing a problem.

Let us assume that a pixel data is to be transferred to other pixel position. Usually, each word of the memory stores a data of a plurality of horizontally contiguous pixels. Accordingly, when the pixel data is to be transferred to other pixel position, shifting operation to align the bit positions or selecting operation of source pixel data is required to align the bit positions for operation. In the past, the transferring was done by a software. For example, when a data in a rectangular area is to be transferred, additional steps for moving pointers for designating source pixels and destination pixels, and counting the number of times of transfer are required. As a result, when a general purpose microprocessor is used, several to several tens microseconds are required to transfer one pixel data and hence a high processing speed is not attained.

The present invention provides image processing method and apparatus which enables high speed processing of memory updating of multi-color and, multi-tone data, pattern drawing, and pixel data transfer.

Another related prior art of this type of image processing apparatus is disclosed in Great Britain Patent GB 2,087,696A.

It is an object of the present invention to provide a graphic and image processing apparatus which can draw a pattern of a multi-color or multi-tone data having each pixels represented by a plurality of bits, at a substantially same processing speed as that for a binary image data.

It is another object of the present invention to provide an image processing apparatus which can calculate an address in a display memory at a high speed based on a logical address of an image.

In accordance with one aspect of the present invention, the image processing apparatus comprises means for sequentially calculating pixel addresses each including information for designating a display memory address and a pixel position in one-word display data at that address, based on a display control data, means for logically operating on drawing data for the designated pixel bits for the calculated one-word pixel address based on pixel position information, and means for writing the logically operated on data into the display memory address.

In accordance with another aspect of the present invention, the image processing apparatus comprises logical address operation means for providing a logical address representing a relative position of a pattern to an origin point based on a display control data, and means for calculating a physical address in a display memory based on the logical address.

In accordance with other aspect of the present invention, the image processing apparatus comprises means for calculating shift amount based on information for designating a pixel position in a source word and information for designating a pixel position in a destination word, when a display data is to be transferred in a graphic pattern display memory, and shift means for multiple shifting a plurality of bits.

In accordance with a further aspect of the present invention, the image processing apparatus comprises a command register for storing a command code contained in a command supplied as a display control data, a decoder for decoding a portion of the command code stored in the command register to generate a type and a sign of operation to be carried out for a current coordinate, a code register for storing the output of the decoder, means for calculating pixel coordinate on a graphic pattern display memory based on a control signal and means for designating a position on the graphic pattern display memory based on the coordinates.

Figure 3:
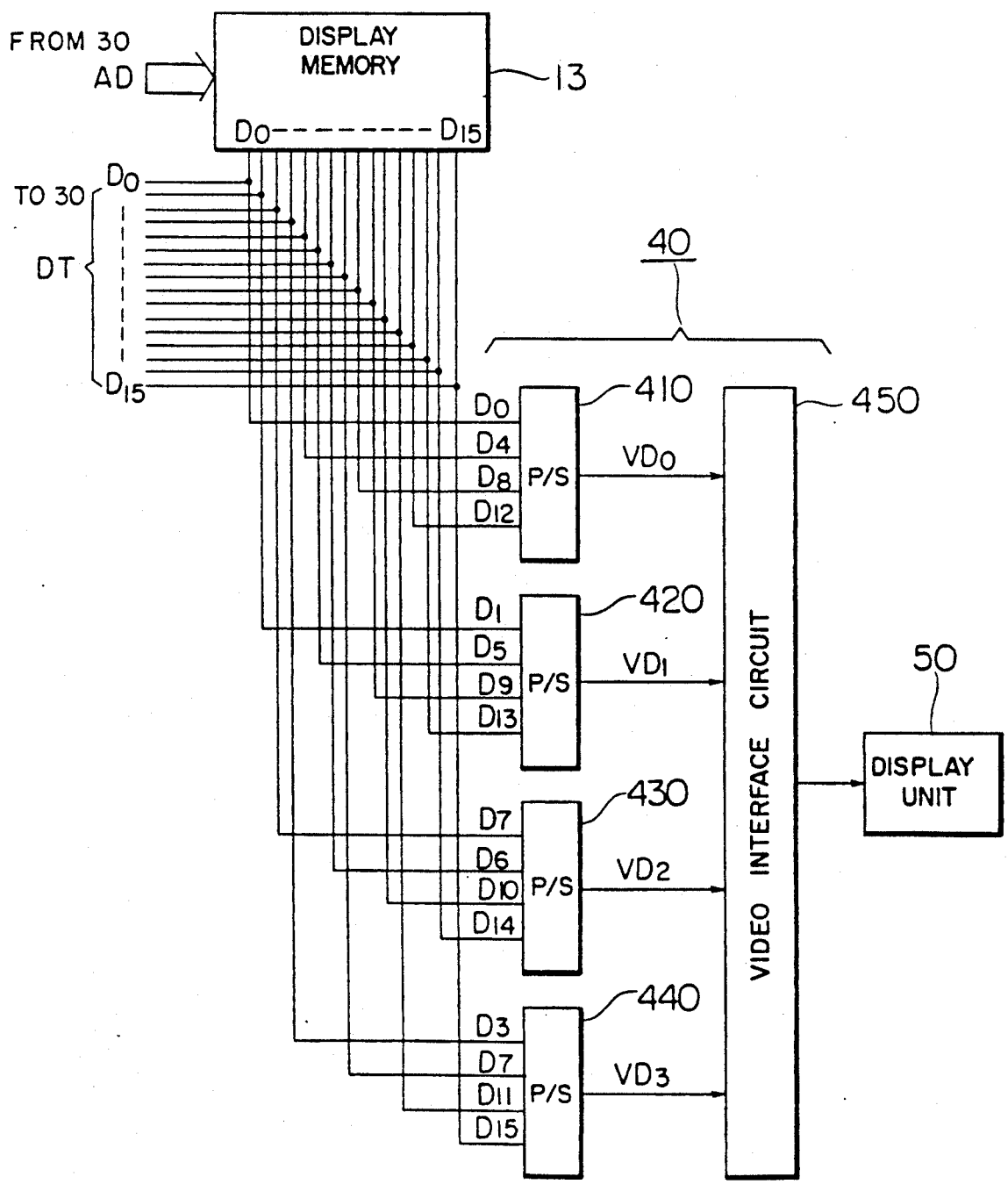
Figure 5:
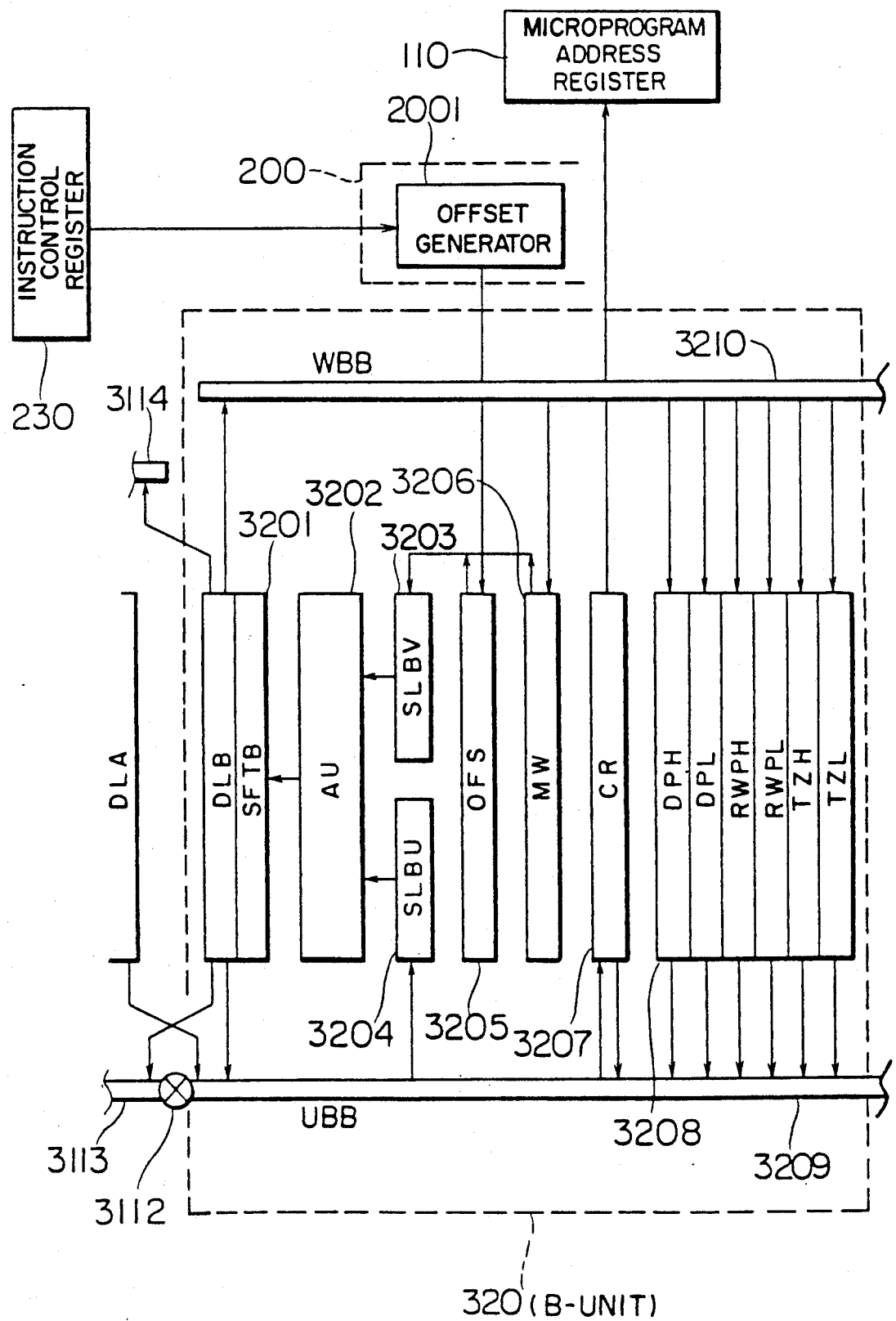
Figure 6:
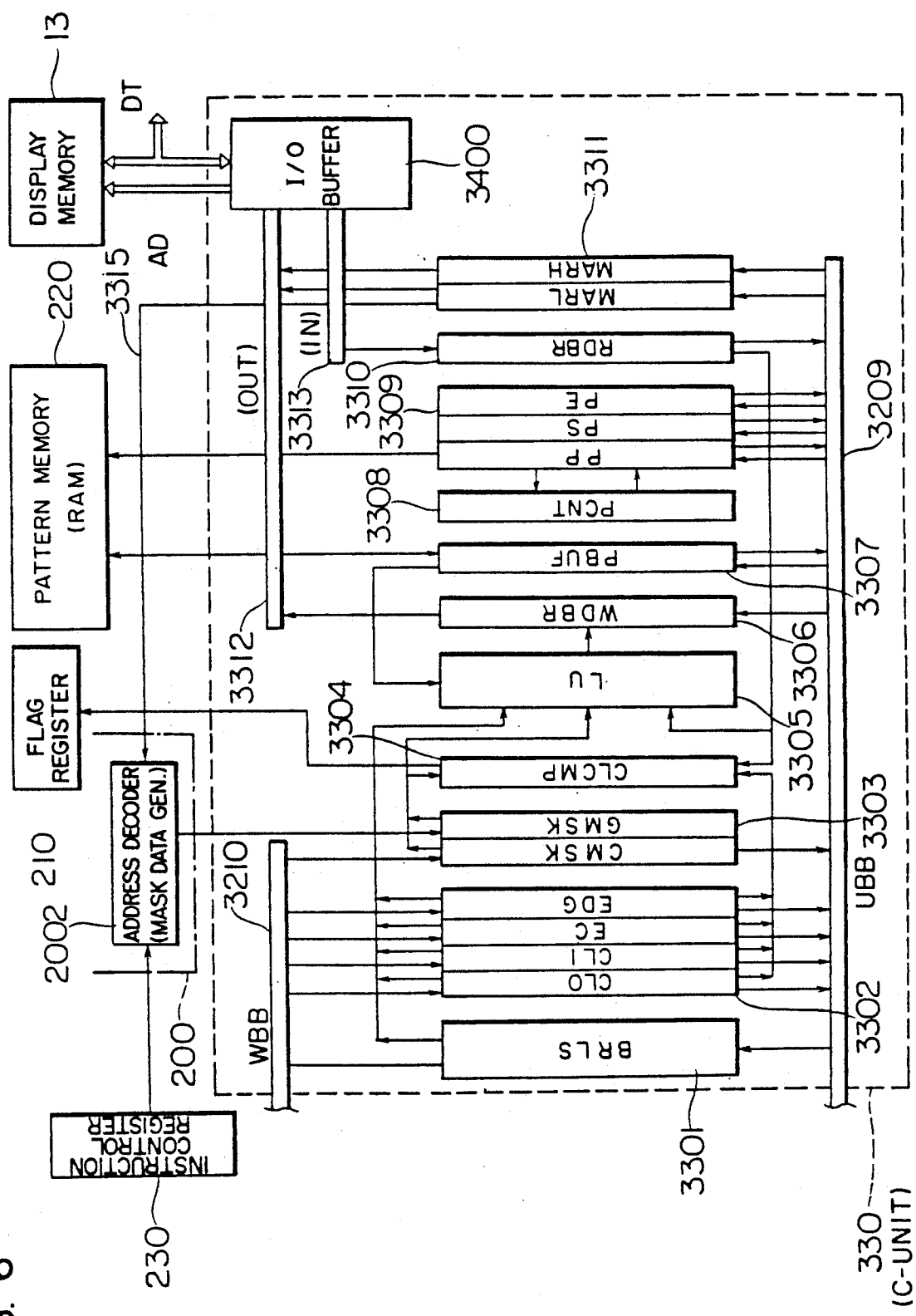
Figure 9A:
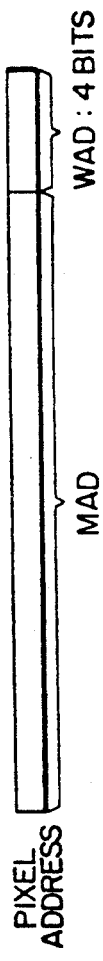
Figure 9B:
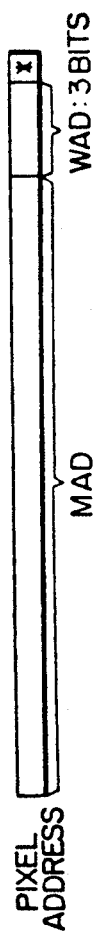
Figure 9C:
Figure 9D:
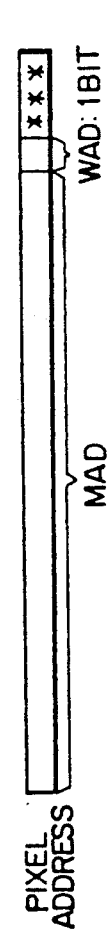
Figure 9E:
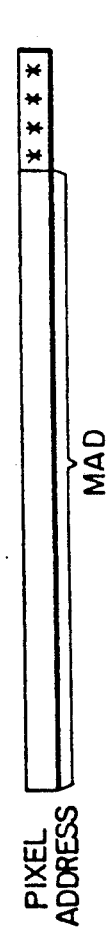
Figure 10:
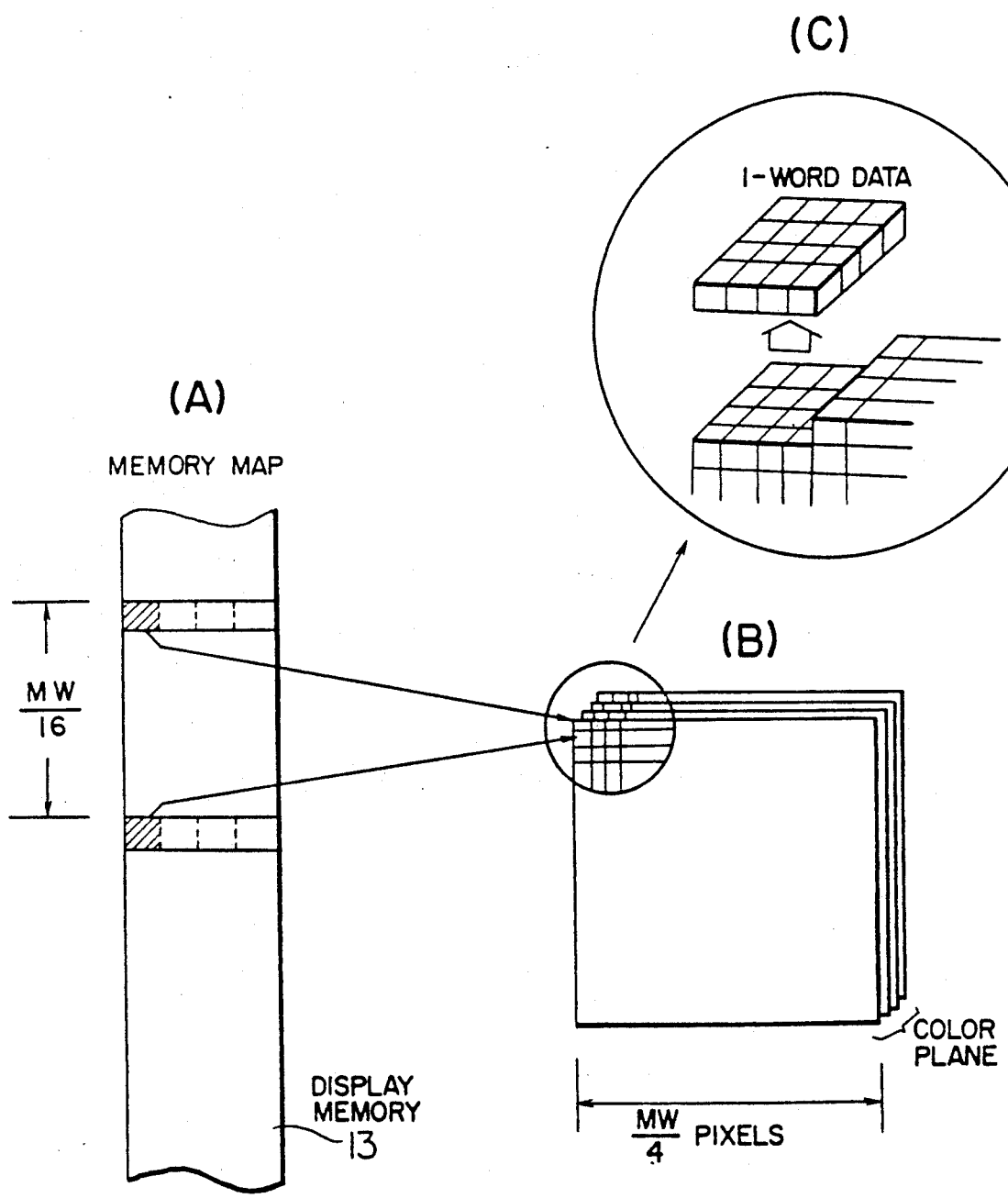
Figure 11:
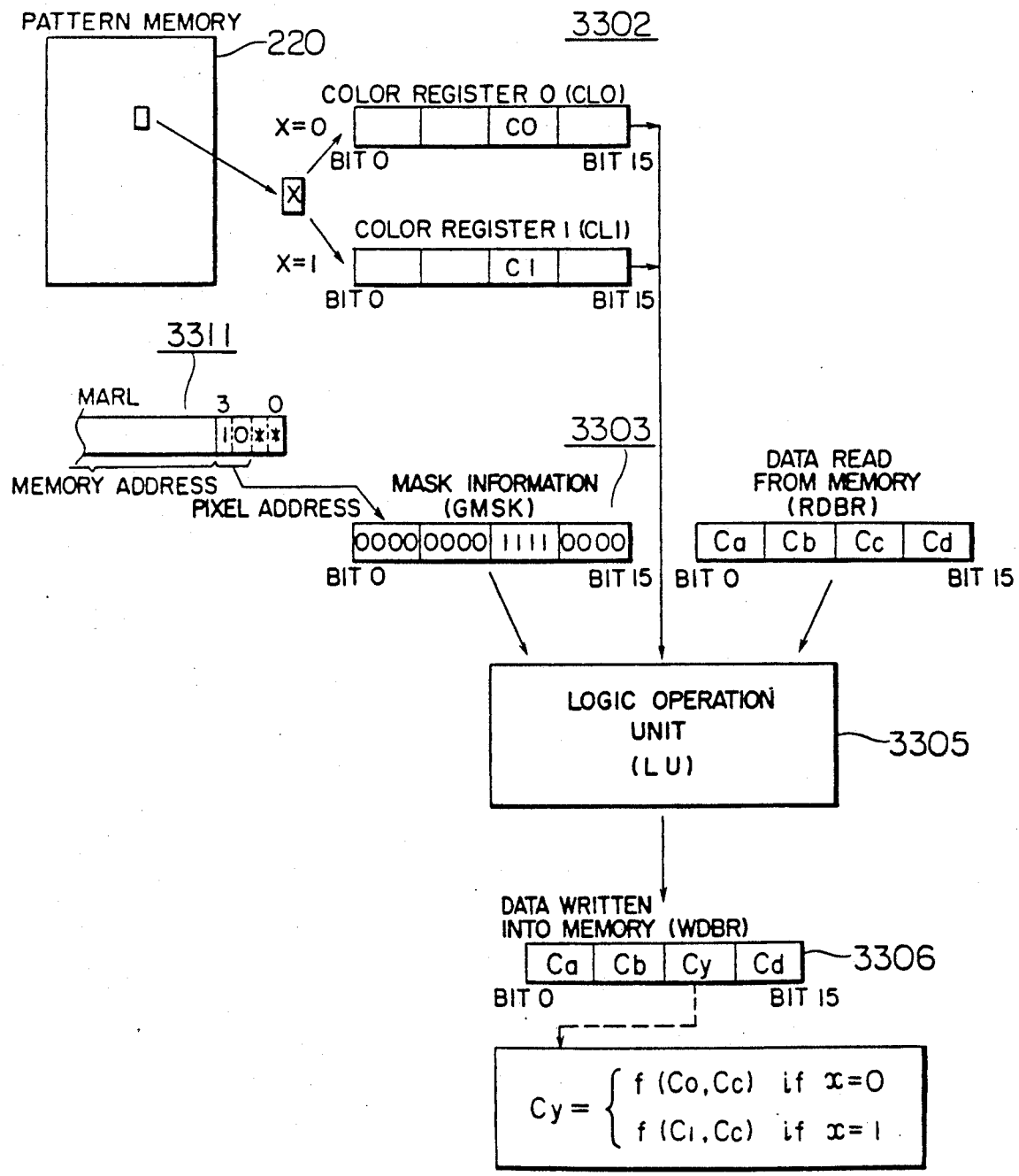
Figure 12:
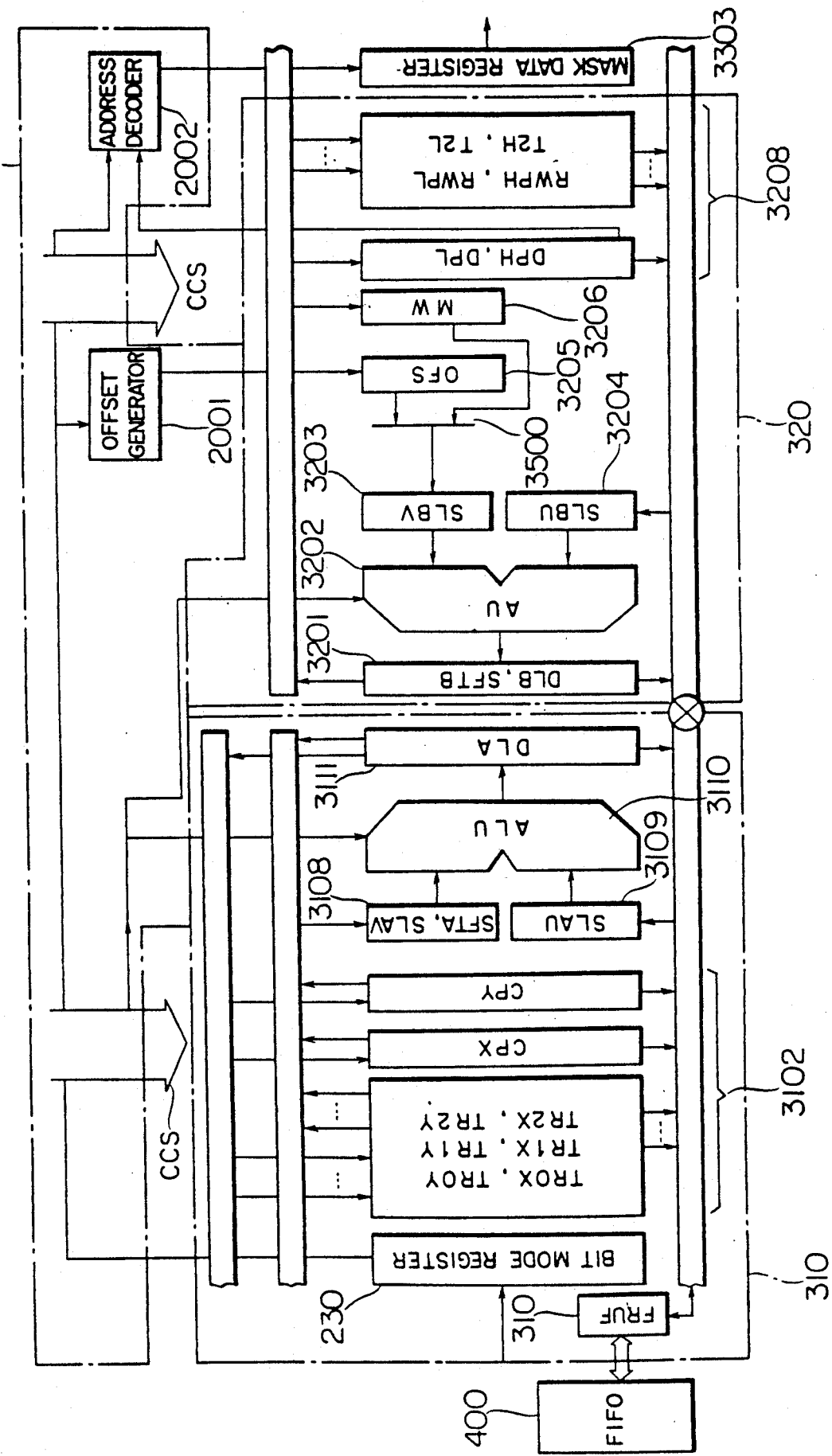
Figure 13:
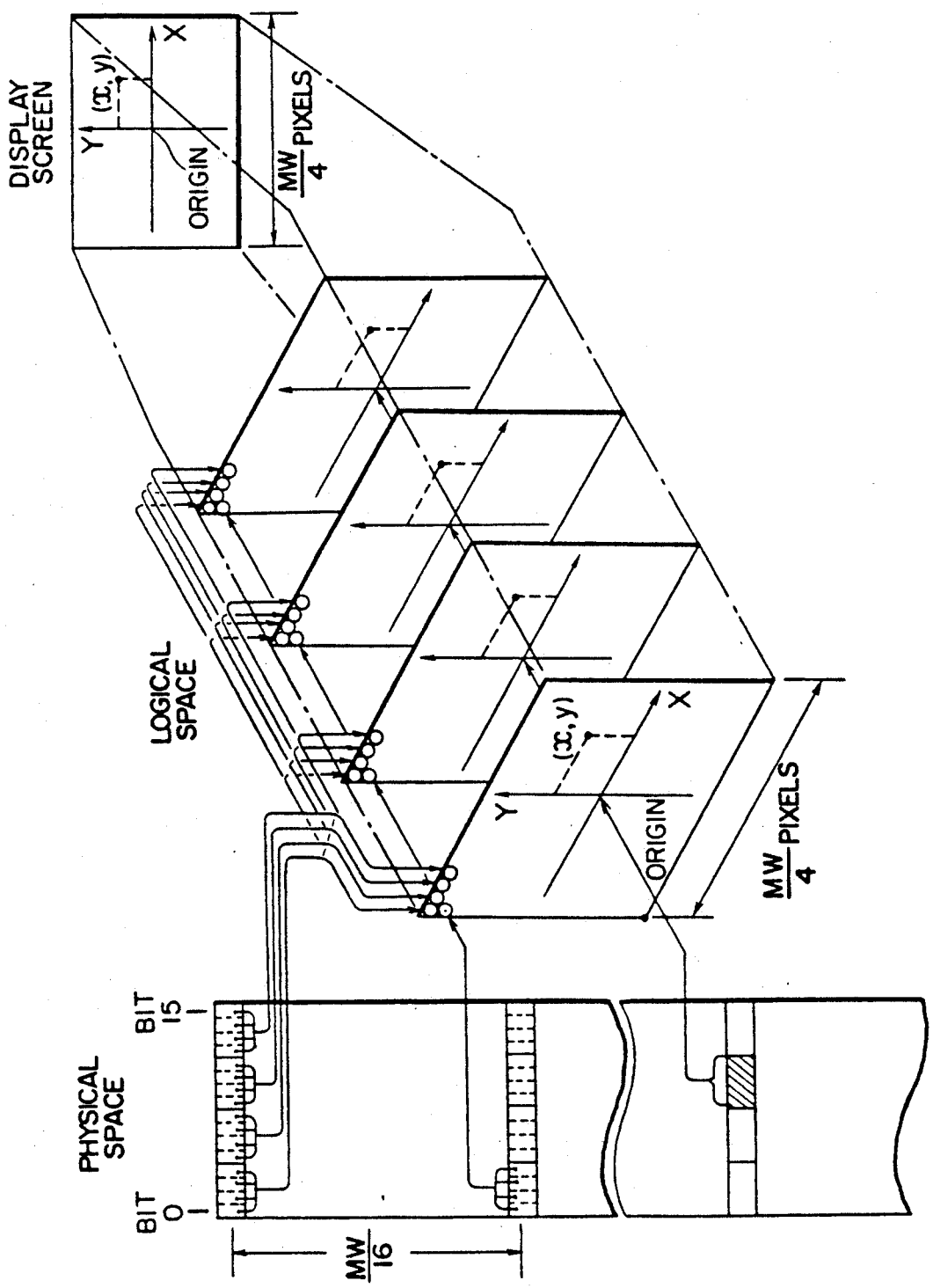
Figure 14A:
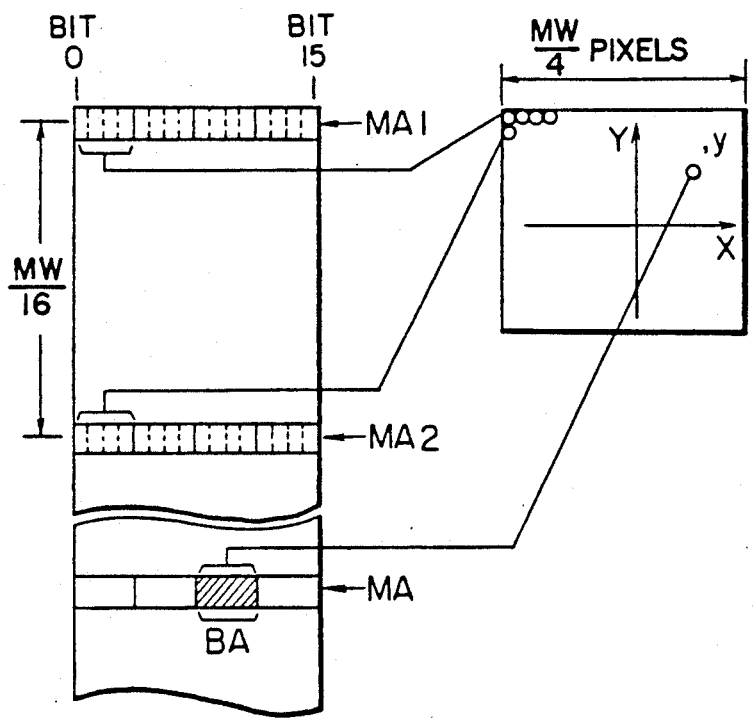
Figure 14B:
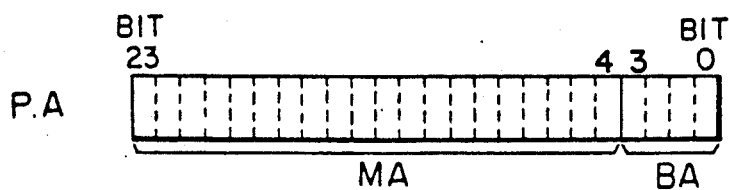
Figure 14C:
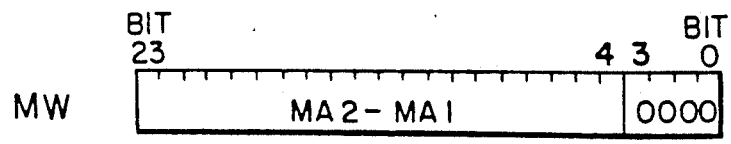
Figures 17A, 17B, 18:
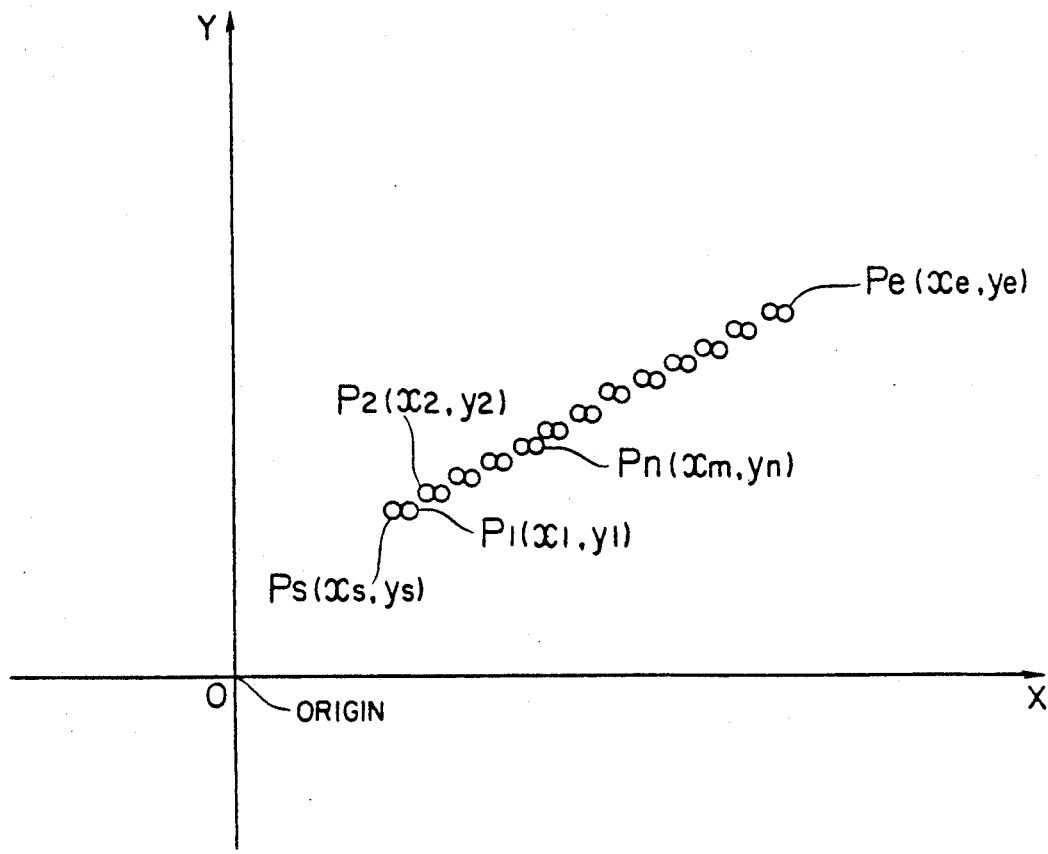
Figure 19:
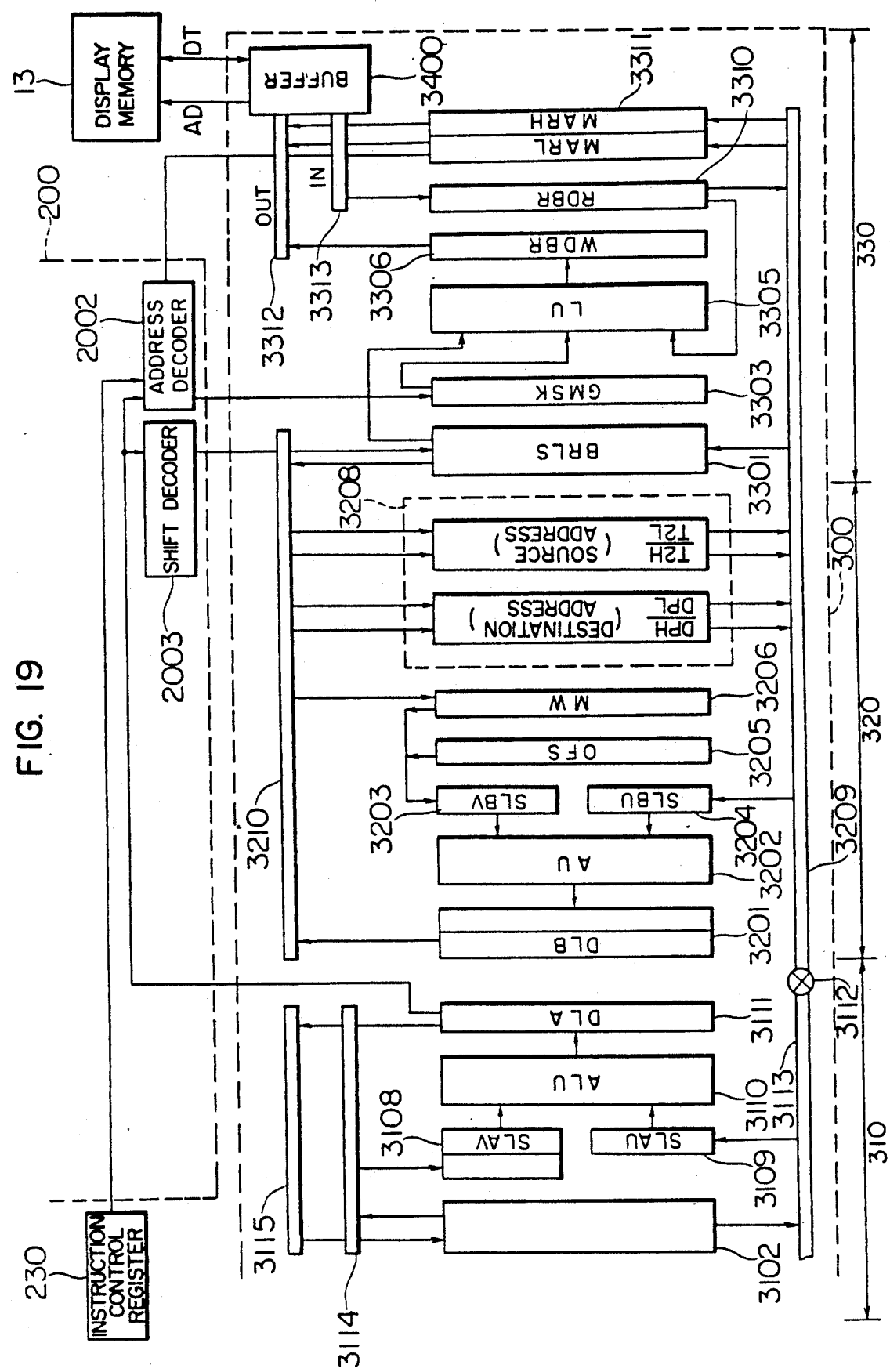
Figure 21:
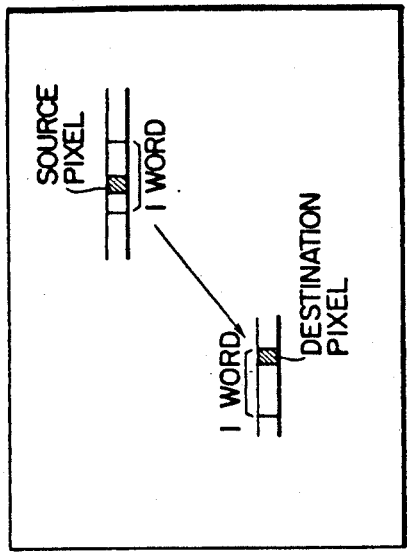
Figure 20A:
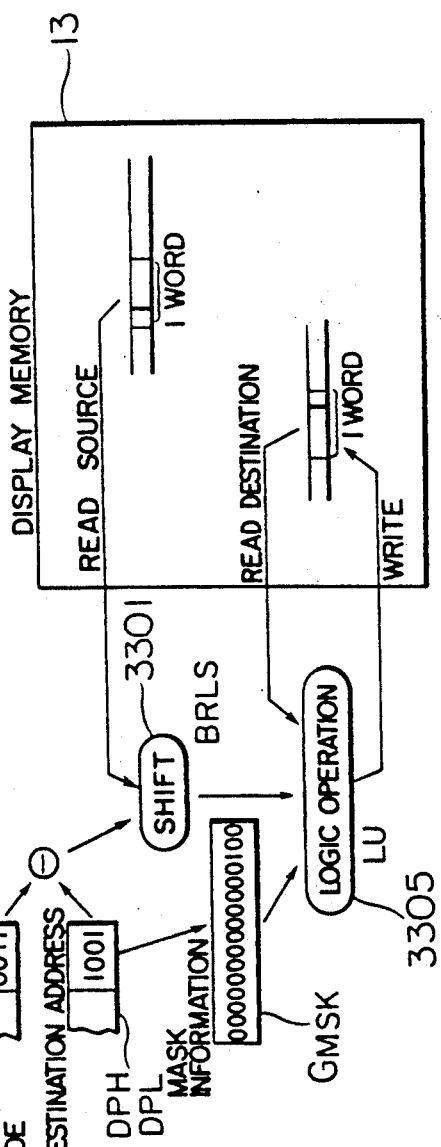
Figure 20B:
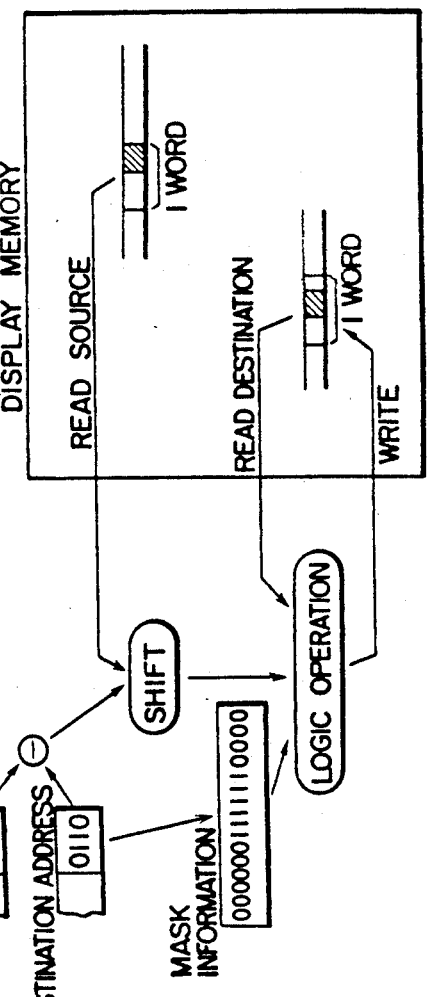
Figure 22:
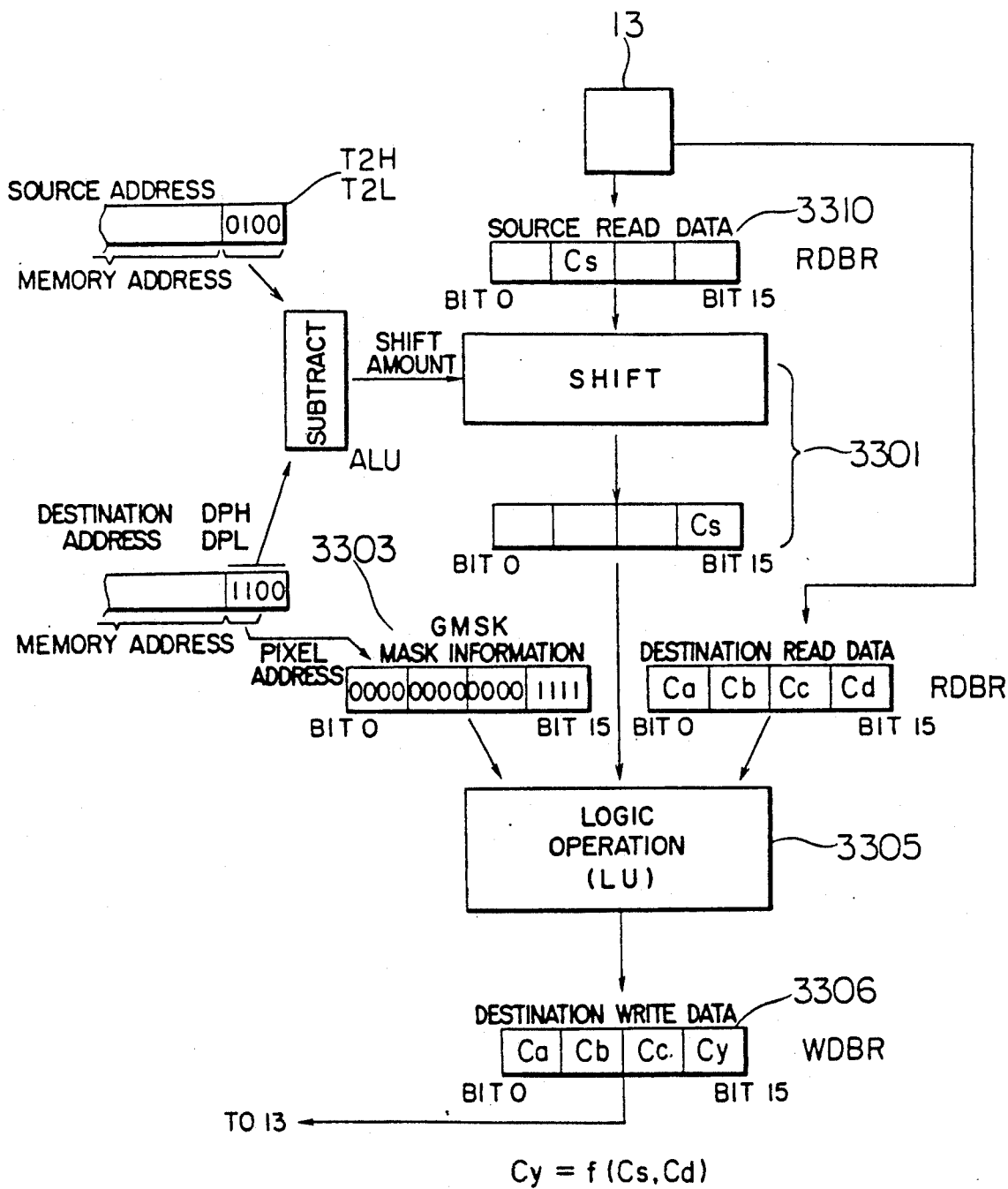
Figure 23:
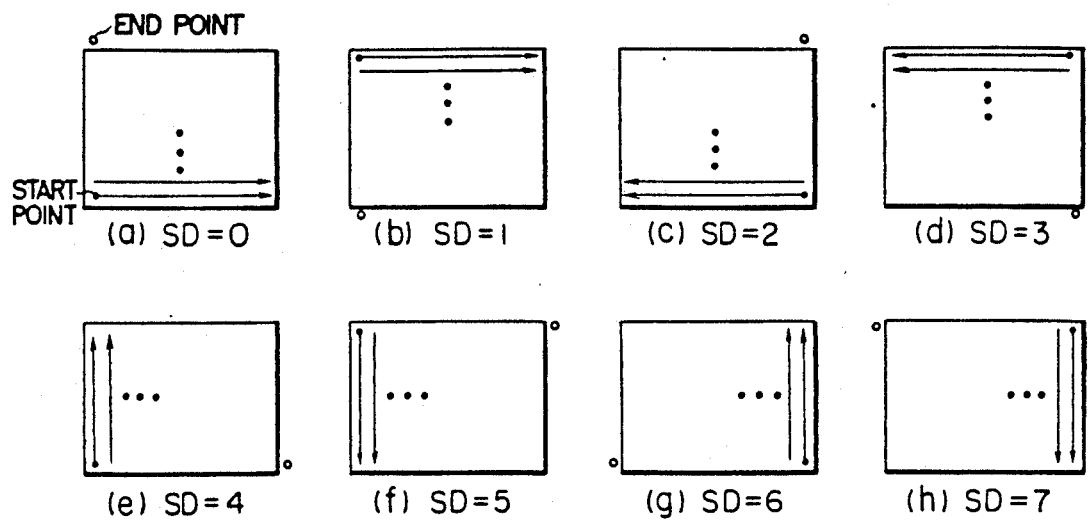
Figure 24:
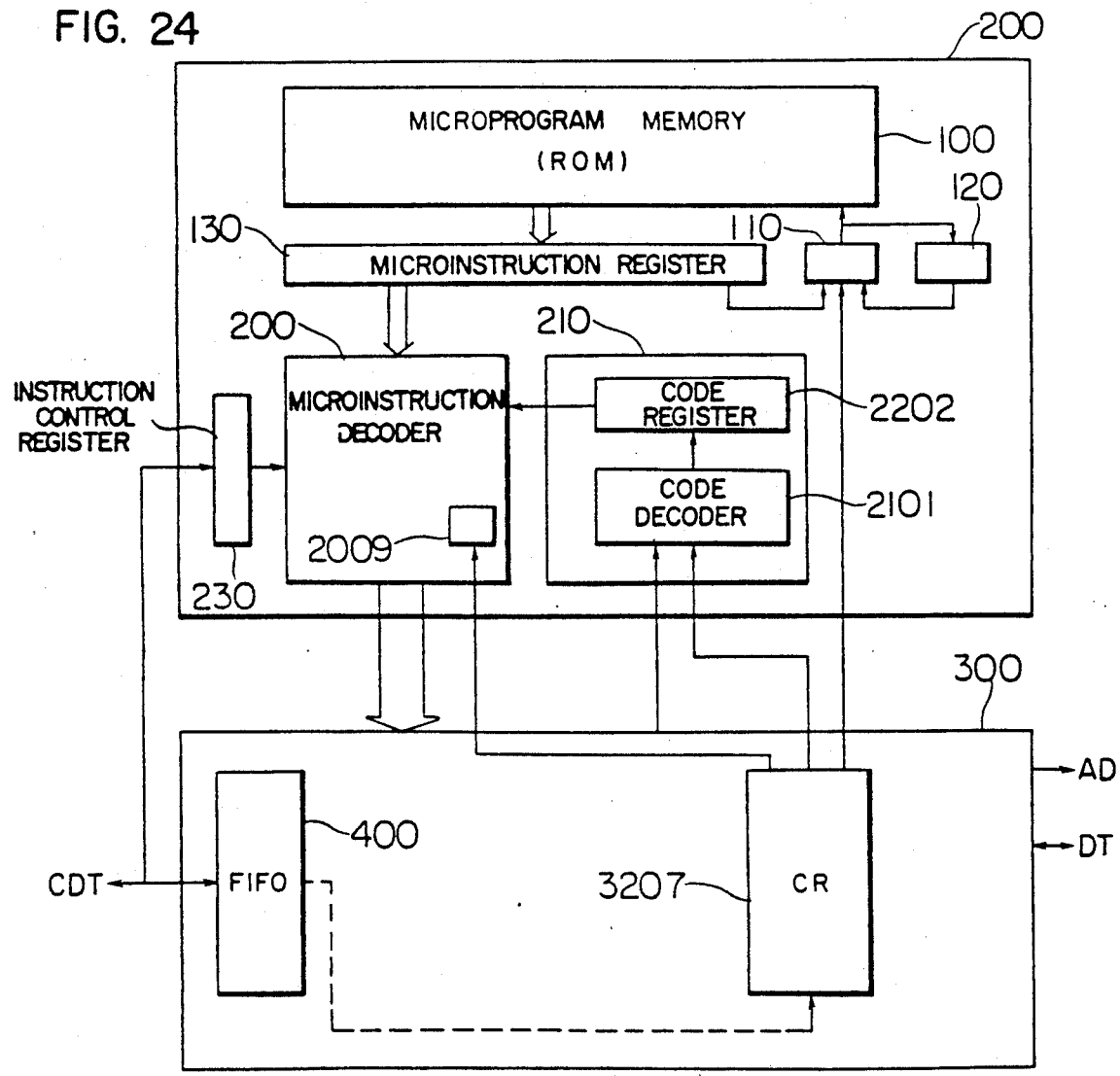
Figure 28:
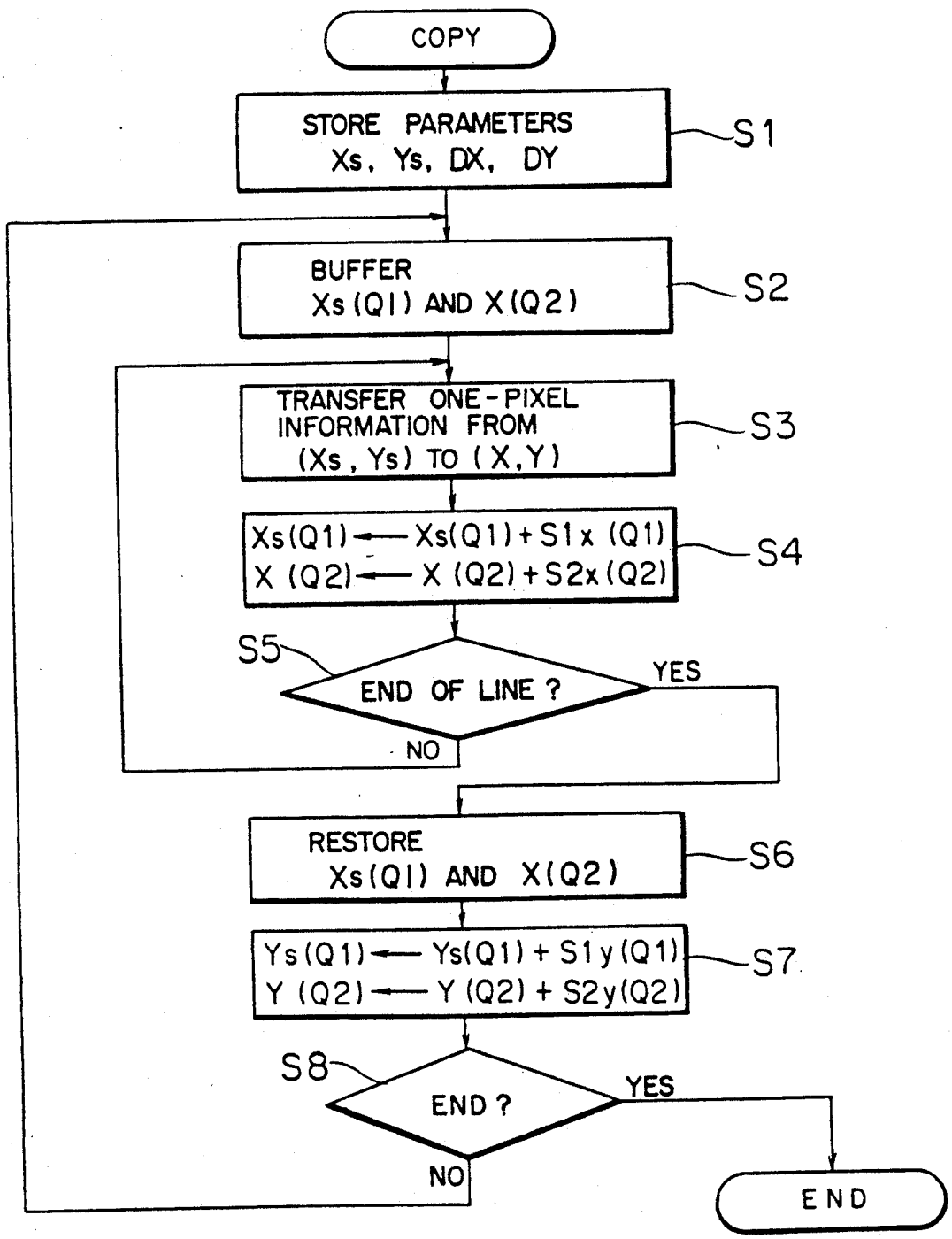

The present invention will be apparent from the following detailed description taken in conjunction with the accompanying drawings, in which:

FIG. 1 is a block diagram of the present invention;

FIG. 2 is a block diagram of a graphic pattern processing apparatus of the present invention, FIG. 3 illustrates configuration of a display memory for a 4 bits per pixel display, FIG. 4 shows a specific circuit of a logical address calculation unit in FIG. 2, FIG. 5 shows a specific circuit of a physical address calculation unit in FIG. 2, FIG. 6 shows a specific circuit of a color data processing unit in FIG. 2, FIG. 7 illustrates functions of fields of a microinstruction, FIGS. 8a-8e show bit configurations of a display memory in respective modes, and FIGS. 8f shows a configuration of an instruction control register, FIGS. 9a-9e show pixel addresses corresponding to FIGS. 8a-8e, FIG. 10 shows a spatial arrangement of the display memory in a 4 bits/pixel mode, FIG. 11 shows the flow of drawing operation for one pixel (4 bits/pixel), FIG. 12 show a configuration for translating a logical address to a physical address, extracted from FIGS. 4, 5 and with addition of certain functions, FIG. 13 shows the relationship between a physical address, a logical address space and a display screen in one mode (4 bits/pixel), FIGS. 14a-14c illustrate an operation of FIG. 13, FIG. 15 shows a bit mode and a corresponding bit address indicating a pixel position in one word, FIGS. 16a-16d illustrate the relationship between a mask data and a bit address, FIG. 17a shows a basic operation in address translation, FIG. 17b shows a bit address offset value, FIG. 18 illustrates a straight line drawn by the present invention, FIG. 19 shows an embodiment for transferring pixel information, in which those elements shown in FIGS. 4, 5 and 6 which are not pertinent to the information transfer are omitted, FIGS. 20a and 20b illustrate an operation of FIG. 19, FIG. 21 illustrates transfer of one pixel data, FIG. 22 shows a flow of transfer operation, FIG. 23 shows the direction of movement of a transfer pointer in rectangular area designation, FIG. 24 shows a configuration for calculating and controlling a pixel position, with only pertinent elements in FIGS. 4, 5 and 6 being shown, FIGS. 25a-25e shows a format of a transfer (copy) command, FIG. 26 illustrates the operation of the transfer command, FIG. 27a shows a code register, FIGS. 27b and 27c show a format of a pattern command, and FIG. 28 shows a process flow chart for the copy command.

FIG. 1 is a block diagram showing an overall configuration of a graphic pattern processing apparatus of the present invention. In FIG. 1, the graphic pattern processing apparatus comprises an operation unit 30 which controls writing, updating and reading of a display data in a display memory 13 and a control unit 20 for controlling the operation unit 30 in a predetermined sequence. The display data read from the display memory 13 by the graphic pattern processing apparatus is converted to a video signal by a display conversion unit 40 and displayed on a display unit 50.

The operation unit 30 controlled by the control unit 20 sequentially calculates pixel addresses each including information designating an address of the display memory 13 and a pixel position in one word of display data in the display memory 13, reads out one word of display data in the display memory based on the address information of the display memory 13 at the calculated address, logically operates only predetermined pixel bits of the display data in accordance with information designating a plurality of bit positions corresponding to designated pixel positions defined based on pixel position designation information at the calculated pixel address, and writes the logically operated result into the display memory 13. Numeral 60 denotes an external computer. The graphic pattern processing apparatus operates in accordance with control data such as instructions and parameters sent from the external computer 60.

FIG. 2 is a block diagram of one embodiment of the graphic pattern processing apparatus of the present invention.

In FIG. 2, the control unit 20 comprises a microprogram memory 100, a microprogram address register 110, a return address register 120, a microinstruction register 130, a microinstruction decoder 200, a flag register 210, a pattern memory 220 and an instruction control register 230.

The operation unit 30 comprises an operation control unit 300 and a FIFO (first-in first-out) memory 400. The operation control unit 300 comprises a logical address operation unit (A-unit) 310, a physical address operation unit (B-unit) 320 and a color data operation unit (C-unit) 330.

The A-unit 310 primarily determines a drawing point on a screen in accordance with a draw algorithm, the B-unit 320 calculates a necessary address in the display memory and the C-unit generates color data to be written into the display memory.

FIG. 3 shows a configuration of a display unit for displaying each pixel by four bits. The display data designated by the graphic pattern processing apparatus of FIG. 2 is displayed by the display unit 50.

In FIG. 3, $D_0$, $D_4$, $D_8$ and $D_{12}$ of a display data DT read from the display memory 13 in accordance with an address AD signals from the graphic pattern processing unit (FIG. 2) are supplied to a 4-bit parallel-serial converter 410 in the display conversion unit 40. The converter 410 produces a video signal $VD_0$. Similarly, $D_1$, $D_5$, $D_9$ and $D_{13}$ of the display data DT are supplied to a parallel-serial converter 420 in the display conversion unit 40, and the converter 420 produces a video signal $VD_1$. $D_2$, $D_6$, $D_{10}$ and $D_{14}$ of the display data DT are supplied to a parallel-serial converter 430 in the display conversion unit 40, which produces a video signal $VD_2$. $D_3$, $D_7$, $D_{11}$ and $D_{15}$ of the display data DT are supplied to a parallel-serial converter 440 in the display conversion unit 40, which produces a video signal $VD_3$. The video signals $VD_0$–$VD_3$ are supplied to a video interface circuit 450 which carries out color conversion and D to A conversion, and a resulting signal is displayed on the display unit 50.

Units in the operation control unit 300 are now explained. FIG. 4 shows a detail of the logical address operation unit 310. It comprises a FIFO buffer (FBUF) 3101, general purpose registers (TR0Y, TR0X, TR1X, TR1Y, TR2X, TR2Y, CPX, CPY) 3102, area control registers (XMIN, YMIN) 3103 and (XMAX, YMAX) 3105, an area comparator (ACMP) 3104, end point registers (XEND, YEND) 3106, an end comparator (ECMP) 3107, source latches (SFTA, SLAV) 3108 and (SLAU) 3109, an arithmetic logic operation unit (ALU) 3110, a destination latch (DLA) 3111, a bus switch 3112, read buses (UBA, VBA) 3113 and 3114, and a write bus (WBA) 3115.

FIG. 5 shows a detail of the physical address operation unit (B-unit) 320. It comprises destination latches (DLB, SFTB) 3201, an arithmetic operation unit (AU) 3202, source latches (SLBV) 3203 and (SLBU) 3204, an offset register (OFS) 3205, a screen width register (MW) 3206, a command register (CR) 3207, general purpose registers (DPL, DPH, RWPH, RWPL, T2H, T2L) 3208, a read bus (UBB) 3209, and a write bus (WBB) 3210. The general purpose registers 3208 comprise current address registers (DPH, DPL) for pixel-by-pixel commands, address registers (WRPH, RWPL) for word-by-word commands and working registers (T2H, T2L).

FIG. 6 shows a detail of the color data generation unit (C-unit). It comprises a barrel shifter (BRLS) 3301, color registers (CL0, CL1, EC, EDG) 3302, a color comparator (CLCMP) 3304, a logic operation unit (LU) 3305, a write data buffer (WDBR) 3306, a pattern RAM buffer (PBUF) 3307, a pattern counter (PCNT) 3308, pattern control registers (PP, PS, PE) 3309, a read data buffer (RDBR) 3310, memory address registers (MARL, MARH) 3311, a memory output bus 3312, a memory input bus 3313 and an input/output buffer 3400. A mask register 3303 comprises a register (CMSK) and a register (GMSK).

An operation of the embodiment thus constructed is now explained. Basic operations of the respective units are first described.

The display control data CDT shown in FIGS. 1 and 2 is an instruction or a parameter sent from other unit such as a central processing unit and it is, on one hand, written into the memory (FIFO) 400 and, on the other hand, into the instruction control register 230. The instruction control register 230 stores graphic bit modes, and in the present embodiment, one of five pixel modes is selected by the data CDT.

The memory 400 is a first-in first-out type memory. An instruction stored in the memory 400 is read by the operation control unit 300 and stored in the register 3101 in the operation control unit 300. A portion CID of the instruction information is transferred to the address register 110.

The address register 110 controls the addressing of the microprogram memory 100 and addresses are updated in synchronism with a clock. A microinstruction as shown in FIG. 7 is read from the microprogram memory 100 in accordance with the address supplied by the address register 110. The instruction read from the memory 100 has 48 bits as shown in FIG. 7 so that one of the #0 to #7 control modes can be selected. The instruction is temporarily stored in the register 130 and controls the operation control unit 300 by a control signal CSS generated by the decoder 200 operated in accordance with a mode selected by the instruction control register 230. Functions of the fields of the microinstruction of FIG. 7 are explained below.

In FIG. 7, "RU" is an instruction which designates a register to be connected to the UBA bus 3113. "RV" is an instruction which designates a register to be connected to the VBA bus 3114. "RW" is an instruction which designates a register to which the data on the WRA bus 3115 is to be written. "FUNCA" is an instruction which designates an operation of the arithmetic logic operation unit 3110 of the A-unit. "SFT" is an instruction which designates a shift mode of a shifter (SFTA) added to the source latch 3108. "ADF-L" is an instruction which designates the low order four bits of a next address to be returned to the microprogram address register 110. "AC" is an instruction which controls the next address of the microinstruction. "ADF-H" is an instruction which designates the high order six bits of the next address to be returned to microprogram address register 110. The microinstructions #4–#7 cannot update the high order six bits of the address. "FUNCB" is an instruction which designates an operation mode of the arithmetic operation unit 3202 of the B-unit. "ECD" is an instruction which designates the execution condition of the operation. "BCD" is an instruction which designates a branch condition. "FLAG" is an instruction which designates a reflection of a flag to the flag register 210. "V" is an instruction which indicates whether an access to the display memory 13 is tested or not. "FIFO" is an instruction which controls read/write of the FIFO 400. "LITERAL" is an instruction which designates an 8-bit literal data. "LC" is an instruction which designates a generation mode of the literal data. "FF" is an instruction which controls setting and resetting of a flip-flop. "S" is an instruction which designates a selection of a code flag. "MC" is an instruction which controls read/write of the display memory 13. "DR" is an instruction which controls scan of the pattern RAM. "BC" is an instruction which controls the input path to the arithmetic operation unit 3202 of the B-unit. "RB" is an instruction which selects the read/write registers of the B-unit.

The microinstruction includes the above instructions so that the control unit 20 controls the operation unit 30.

The return address register 120 stores a return address to a subroutine. The flag register 210 stores condition flags. The pattern memory 220 stores a basic pattern used for processing the graphic pattern. Bit layouts of the data used in the present embodiment are now explained.

A graphic mode is first described. In the present embodiment, one of five operation modes can be selected in accordance with the designation by the graphic bit mode (GBM) stored in the instruction control register 230.

FIGS. 8a–8e show one-word bit configurations of the display memory in the respective modes.

(a) 1 bit/pixel mode (GBM="000")

It is used to represent one pixel by one bit, as is used in a monochromatic image. Data of 16 continuous pixels is stored in one word of the display memory 13.

(b) 2 bits/pixel mode (GBM="001")

It represents one pixel by two bits. Up to four colors or tones can be displayed. Thus, data of eight continuous pixels is stored in one word of the display memory 13.

(c) 4 bits/pixel mode (GBM="010")

It represents one pixel by four bits. Data of four continuous pixels is stored in one word of the display memory.

(d) 8 bits/pixel mode (GBM="011")

It represents one pixel by eight bits. Data of two pixels is stored in word of the display memory.

(e) 16 bits/pixel mode (GBM="100")

It represents one pixel by 16 bits. One-pixel of data is stored in one word of the display memory.

FIG. 8(f) shows the instruction control register 230.

Pixel addressing is now explained. FIG. 9 shows pixel addresses for the respective modes of FIG. 8. The register 3208 of the physical address operation unit controls the bit address (physical address) WAD having the low order four bits of the memory address added thereto. The low order four-bit information WAD is used to designate a pixel position in the word and operates in accordance with the bit/pixel mode. A symbol "*" represents a bit not relevant to the operation.

FIG. 10 shows the spatial arrangement of the display memory for the "4 bits/pixel mode" of c) above. Memory addresses are assigned as linear addresses as shown in memory map of FIG. 10(A), which are displayed as a two-dimensional image as shown in FIG. 10(B). A horizontal width of the screen is stored in the screen width register (MW) 3206 of FIG. 5, and the MW indicates the number of bits in the horizontal width of the screen. In the 4 bits/pixel mode, MW/4 pixels are horizontally displayed. Since one pixel is displayed by four bits, one-word data is displayed by horizontally continuous four-pixel data as shown in FIG. 10C. The offset generator 2001 of FIG. 5 generates an offset value "4" which is stored in the offset register 3205. Accordingly, in order to horizontally shift the physical address by one pixel, the offset value may be added or subtracted. In order to vertically shift the physical address by one pixel, the content of the register (MW) 3206 may be added or subtracted. The bit layouts of the data used in the present embodiment have thus been described.

The operation for storing the image data into the display memory 13 is now explained.

The control data CDT such as the instruction or the parameter sent from the external central processing unit is, on one hand, written into the memory 400 and, on the other hand, written into the instruction control register 230.

The operation when the graphic bit mode (GBM) stored in the instruction control register 230 in the 4 bits/pixel mode (GBM="010") is explained below.

When the graphic bit mode (GBM) in the instruction control register 230 designates the 4 bits/pixel mode, the one-word data in the display memory 13 is handled as the 4-bit group as shown in FIG. 8(C).

The signals CDT such as the instructions and the parameters from the external central processing unit are sequentially stored in the memory 400. The data stored in the memory 400 is read into the FIFO buffer 3101 of the A-unit 310. The data stored in the FIFO buffer 3101 is read in by transmission through the internal bus 3113. It is supplied from the bus to the arithmetic logic operation unit (ALU) 3110 by transmission through the source register (SLAU) 3109, a predetermined operation is carried out and the operation result is temporarily stored in the destination latch (DLA) 3111. The result is stored in the general purpose register 3102 by transmission through the bus WBA. The general purpose register 3102 stores the current coordinate in a coordinate space.

The current X-Y coordinate in the general purpose register 3102 are read by transmission through the read bus 3113 or 3114 and are supplied to the arithmetic logic operation unit (ALU) 3110. The operation result of the operation unit (ALU) 3110 is again stored in the general purpose register 3102 through the destination latch (DLA) 3111 and the write bus 3115. Those series of operations are executed under the control of the microprogram instruction shown in FIG. 7.

The data on the write bus 3115 is supplied to the area control registers 3103 and 3105, and compared by the area comparator 3104. The comparator 3104 determines if the data on the write bus 3115 falls within the range between an X-axis minimum value (XMIN) and an X-axis maximum value (XMAX), or the range between a Y-axis minimum value (YMIN) and a Y-axis maximum value (YMAX), and the result is sent to the flag register 210.

The data on the write bus 3115 is stored in the end point register 3106 and supplied to the end comparator 3107. The comparator 3107 compares the data on the write bus 3115 with X-axis and Y-axis end points previously stored in the register 3106 to determine if the data corresponds to the end points. The comparison result is transferred to the flag register 210.

As described above, the results in the comparators 3104 and 3107 and the operation unit 3110 are transferred the flag register 210 and supplied to the microinstruction decoder 200 so that it is used to change the flow of the microprogram.

The A unit 310 operates in the manner described above and decodes the X-Y coordinate given by the parameter to interpret an instruction such as line drawing or circle drawing.

Referring to FIG. 5, the operation of the B-unit 320 is described.

The display control data is initially set in the register 3208 by transmission through the buses UBB and AU and the registers DLB and WBB. The data in the register 3208 is supplied to the arithmetic operation unit (AU) 3202 by transmission through the read bus 3209 and the source latch 3204. The operation result of the operation unit 3202 is temporarily stored in the destination latch 3201 and supplied to the buses 3113, 3114, 3209 and 3210. It is written into the register 3208 by transmission through the bus 3210. The register 3208 has two 16-bit words so that a physical address is stored in a 32-bit word. The register 3208 includes three 32-bit registers so that it can store three data. The registers DP (DPL, DPH) of the register 3208 store the physical address of the actual image point corresponding to the current image point X-Y. As the X-Y coordinate of the register 3102 of the A-unit 310 is shifted, the physical address of the register DP is shifted accordingly.

The physical address can be changed by adding or subtracting a predetermined variable value (offset value X distance to a destination point) to or from the original physical address in the X-axis and adding or subtracting a predetermined value in the Y-axis. A constant required for horizontally shifting the pixel address by one pixel is set in the offset register 3205 depending on an information designated by the offset generator 2001. The constant and the data are operated on in the operation unit 3202 so that the physical address horizontally shifted is calculated. For example, when the pixel mode is the 1 bit/pixel mode, the constant is 1 and the 1-pixel shift results in 1-bit shift. In the 4 bits/pixel mode, the constant is 4 and the 1-pixel shift results in 4-bits shift.

In order to vertically shift by one pixel, a constant stored in the screen width register 3206 is used for operation so that one-pixel shift is attained.

The B-unit 320 operates in the manner described above to calculate the actual physical address corresponding to the X-Y coordinate determined by the A-unit 310.

Referring to FIG. 6, the operation of the C-unit 330 is described.

The C-unit 330 is connected to the display memory 13 shown in FIG. 10 by transmission through the output bus 3312 and the input bus 3313. The address information AD is first supplied from the C-unit 330 to the output bus 3312 and then the data DT is supplied.

The address information AD is written into the memory address register 3311 through the B-unit 320 and the UBB bus 3209, and stored in the MARL and MARH of the memory address register 3311. The memory address stored in the register 3311 is sent to the display memory 13 through the output bus 3312 and a designated one-word display data DT is read from the display memory 13 by transmission through the input bus 3313. The display data DT read is stored in the read data buffer 3310. When the display data DT is a graphic pattern data, it is supplied to the operation unit 3305.

The mask information (which designates a bit in a word to be masked) from the mask register 3303 is supplied to the operation unit 3305. The mask information is sent to the operation unit 3305 from the register (CMSK) which is directly written from the WBB bus 3210 or the register (GMSK) which stores a data generated by the address decoder 2002.

In addition, the color information is selected by the color register 3302 and it is supplied to the operation unit (LU) 3305, which logically operates it in accordance with the data DT, mask information and the color information and supplies the operation result to the write register (WDBR) 3306. The pattern information is stored in the pattern RAM buffer (PBUF) 3307 from the pattern RAM 220 by the designation by the address signal generated by the pattern counter 3308 and the image pattern registers (PP, PS, PE) 3309.

The C-unit operates in this manner to convert the color information.

The drawing operation is now explained. FIG. 11 shows a flow of the drawing operation of one pixel in the 4 bits/pixel mode.

The data read from the pattern RAM 220 by the address designated by the image pattern registers (PP, PS, PE) 3309 and the pattern register (PCNT) 3308 is stored in the pattern RAM buffer 3307 to select CL0 and CL1 of the color register 3302. The data (Ca, Cb, Cc, Cd) read from the display memory 13 is stored in the read data buffer 3310. In the present embodiment, the color data and the data read are 4-bit color information or tone information. The one-bit pattern information is read from the pattern memory 220 and the color register 0 (CL0) or the color register 1 (CL1) is selected depending on the content "0" or "1" (X="1" or X="0") of the one-bit pattern information and the content of the selected register is supplied to the logic operation unit 3305. The low order 4 bits of the physical address information stored in the memory address register 3311 is "10**" in FIG. 11 and this information is supplied to the mask register 3303 through the address decoder 2002, which generates the mask information GMSK. On the other hand, the high order excluding the low order four bits of the memory address register 3311 is outputted as the display memory address so that one word of the display memory 13 is read out. Only the portions of the logic operation unit 3305 which are designated by the "1" bit of the mask register (GMSK) 3303 are logically operated to produce the write data Cy, which is then stored in the write buffer 3306. The logical operation of the logic operation unit 3305 includes replacement of the content of the color register, logical operations (AND, OR, EOR) and conditional drawing (draw only when the read color satisfies a predetermined condition). In other bit/pixel modes, different GMSK information is generated but similar logical operation is performed. In this manner, the address information AD and the data DT are sent to the output bus 3312 from the address register 3311 and the register 3306 and written into the predetermined addresses of the display memory 13.

In the present embodiment, since one pixel of data can be simultaneously updated by one run of the read, update and write steps, the efficient drawing is attained. In the mode other than the 16 bits/pixel mode, the data of plural pixels is packed in the 16-bit length. Accordingly, the use efficiency of the memory is high and the data transfer efficiency between other device and the display memory is high. Because the operation modes for five different bits/pixel lengths are provided, the flexibility of the usage is high.

Graphic pattern processing which can calculate a physical address corresponding to a logical address at a high speed is now explained. The address Translation by the A-unit 310 and the B-unit 320 in FIG. 2 is attained at a high speed.

FIG. 12 shows units related to the address translation of the units shown in FIGS. 4 and 5 and additional units. The same units as those shown in FIGS. 4 and 5 are designated by the same numerals.

A selector 3500 is controlled by the CCS to select the data from the memory width register (MW) 3206 or the data from the offset data register 3205 (OFS), and supplies the selected data to the arithmetic operation unit (AL) 3202. The operation unit 3202 calculates the physical address corresponding to the logical address.

A physical address space, a corresponding logical address space and a display screen corresponding thereto are explained. FIG. 13 shows the physical address space, the corresponding logical address space and the display screen corresponding thereto in the 4 bits/pixel mode. The relation between the physical address (the number of bits MW in the horizontal direction), the display memory in the logical address space and the display screen is shown in FIG. 13. Four pixels of pixel data wherein each pixel represented by four bits are included in one 16-bit word in the physical address space. Each pixel has one bit in each color memory plane in the memory in the logical address space and those bits are combined to supply a 16 colors (or 16 tones)/pixel signal to the screen. The four pixels in one word of data is horizontally continuous in the memory on the logical address space and on the display screen.

FIG. 14 show the relation among the physical address, the logical address, the memory width MW and the pointer address PA in FIG. 13. FIG. 14(a) shows a memory address MA and a bit address BA in the physical address space, and the relation between them and the display screen. When the memory address of one word which includes a pixel vertically adjacent to one pixel in one word designated by a memory address MA1 is represented by MA2, a memory width MW is defined as shown in FIG. 14(c). When a physical address of a point (x, y) on the screen shown in FIG. 14(a) has the memory address MA and the bit address BA, a pointer address thereof is represented as shown in FIG. 14(b).

The embodiment shown in FIG. 12 attains highly efficient processing even when the data of one pixel is represented by plural bits (multi-color or multi-tone), and one of five operation modes can be selected by the bit mode set in the bit mode register 230, in accordance with FIG. 8.

FIG. 15 shows a relationship between the bit modes shown in FIG. 14 and the bit addresses indicating the pixel positions in one word. The bit address coincides with the start bit address of the pixel data. For example, in the 4 bits/pixel mode, when bits 4-7 of the pixel data are to be processed in the pixel data operation unit 330, the bit address of the low order four bits of the pointer address register 3208 is "4".

FIGS. 16(a)-16(d) show the relation between the mask data stored in the mask register 3303 and the bit address in the 4 bits/pixel mode. When the bits 4-7 of the pixel data are to be processed, the bit address is "4" as described above and only those bits of the mask data which are to be processed with the pixel data are set to "1" and those bits which need not be operated with the pixel data are set to "0". For example, when the bit address is "4", the mask data having only the bits 4-7 are set to "1" is generated by the mask data generator 2002 and stored in the mask data register 3303.

FIG. 17(a) shows basic operations performed in the logical address and physical address operation units in the embodiment shown in FIG. 12, and FIG. 17(b) shows the bit address offset values n generated by the bit address offset generator in the respective bit modes. The bit address offset value is first explained. It is used to update the bit address, and "4" data in the 4 bits/pixel mode, or "1" data in the 1 bit/pixel mode is generated by the offset generator 2001 and stored in the offset data register 3205.

The processing shown in FIG. 17(a) is explained. When the logical address at a point P of the current pixel is (X, Y) and a physical address is PA, the processing for horizontally or vertically shifting the point P by ±1 logical address is shown. When the point P is to be shifted by +1 to shift the pixel data in the X axis (horizontal) positive direction, the logical address operation unit 310 reads out the data (X) from the current pointer (CPX of 3102) and +1 is added in the operation unit 3110 through the source latch 3109. The operation result (X+1) is again stored in the current pointer (CPX of 3102) through the destination latch 3111 as a new logical address X. The physical address operation unit 320 reads out the pointer address from the pointer address register 3208 and it is supplied to the operation unit 3202 as the operand through the source latch 3204. On the other hand, the operand data selector 3500 selectively outputs the data from the offset data register 3205 and it is supplied to the operation unit 3202 as the operand through the source latch 3203. The operation unit 3202 adds the pointer address PA to the bit address offset value n. The sum (PA+n) is again stored in the pointer address register (DPL and DPH of 3208) as a new pointer address through the destination latch 3201. Thereafter, the mask data generator 2202 generates the mask data in accordance with the low order 4 bits of the data stored in the pointer address register 3208, that is, the bit address and the bit mode. The mask data is sent to the pixel data operation unit 3305 through the mask register 3303 for the calculation of the pixel data.

When the point P is to be shifted by +1 in the Y-axis (vertical) positive direction, the logical address operation unit 310 shifts the data of the current pointer Y (CPY of 3102) by +1. On the other hand, the physical address operation unit 320 processes the data of the pointer address register 3208 (DPL, DPH). In X-axis operation, the offset value is added or subtracted, and in Y-axis operation, the data in the memory width register 3206 is added or subtracted (subtraction is the present example). The operation control signal generator 200 generates an add/subtract signal which is applied to the operation unit 3202 in the physical address operation unit 320 when the logical address operation unit 310 performs the X-axis addition/subtraction, and generates the add/subtract control signal which is applied to the operation unit 3202 when the logical address operation unit 310 performs the Y-axis addition/subtraction. It is determined by the address allocation of the display memory corresponding to the display screen. Through these logical operations, the physical address after the shifting of the point P is derived. FIG. 18 shows an example of straight line drawing in the present invention.

When a straight line is to be drawn from a start point Ps (Xs, Ys) to an end point Pe (Xe, Ye), in first pre-processing, a physical address of an origin point is loaded in the DPL and DPH of the pointer address register 3208 from the central processing unit or other control unit and the current pointer X (CPX of 3102) and the current pointer Y (CPY of 3102) are cleared to "0" by the control unit 200. By setting the origin point in this manner, the correspondence between the logical address and the physical address is attained. In a second pre-processing, the logical address (Xs, Ys) of the start point Ps of the line is stored in the current pointers X (CPX) and Y (CPY) and the physical address operation unit 320 calculates the physical address corresponding to the logical address (Xs, Ys). In a third pre-processing, the logical address (Xe, Ye) of the end point Pe is stored in the temporary registers 3102. This terminates the pre-processing. In response to a command to draw the line from the point Ps to the point Pe, from the central processing unit or other control unit, the control unit 200 starts the main processing operation. The control unit supplies control instructions to the operation units 310, 320 and 330 in accordance with a previously stored control procedure. The logical address operation unit 310 determines interim information necessary for processing information used for drawing such as a gradient of a line, based on the logical address (Xs, Ys) of the start point Ps and the logical address (Xe, Ye) of the end point Pe, stores the interim information in the temporary registers 3102 and calculates a logical address ($x_1$, $y_1$) of the next drawing point $P_1$ to be drawn and a physical address corresponding to the logical address ($x_1$, $y_1$). The X-axis address calculation and the Y-axis address calculation are performed by the logical address operation unit 310 and the physical address operation unit 320. In parallel thereto, the pixel data, corresponding to the start point Ps, is read from the display memory and the pixel data of the start point Ps is processed. After the processing of the pixel data, the resulting pixel data is again written into the display memory. Thus, during the two memory accesses for one point, the logical address operation unit 310 and the physical address operation unit 320 calculate the logical address for the next drawing point to be drawn and the corresponding physical address. By repeating the above steps until the end point Pe of the line is reached, the pixel data for drawing the line are sequentially stored in the display memory.

The pixel data read from the display memory is, in a special case, again stored in the display memory after substitution to a predetermined data. The pixels on a line to be drawn are not always of the same intensity or color. Accordingly, the pixel data read is processed with other data and the result is stored in the display memory as a new display pixel data.

While the two-dimensional logical space was discussed in the above embodiment, the present invention can be applied to a higher dimension logical space. Even when the pixel data is represented by plural bits, the logical address and the physical address corresponding to the logical address can be calculated at a high speed.

A high speed transfer of pixel information to other pixel position in a system in which a plural-pixel data is stored in one word of memory is now explained. A high speed processing is attained by a hardware configuration. Those portions shown in FIGS. 4, 5 and 6 which are not relevant to the transfer processing are omitted in FIG. 19. The microinstruction decoder 200 contains an interword address decoder 2002 and a shift decoder 2003. The instruction control register 230 stores therein a transfer mode and a bit mode.

The display memory 13 is configured in 16-bit word configuration and addresses are allocated sequentially. A source address is stored in T2H and T2L of the general purpose register 3208 and a destination address is stored in DPH and DPL. Thus, two 16-bit word registers control the source address and the destination address. The low order four bits of the address information designate the bit position in one word of the memory, and the high order bits designate the address of the display memory.

The shift decoder 2003 decodes the shift information to control shifting in the barrel shifter 3301. In the transfer processing, the arithmetic logic operation unit (ALU) 3110 calculates the difference between the low order four bits of the destination address and the source address and the difference is supplied to the shift decoder 2003 through the destination latch (DLA) 3111.

The interword address decoder generates mask information based on the low order four bits of the address information temporarily stored in the memory address register 3311 and the difference between the low order four bits of the source address and the destination address temporarily stored in the destination latch 3111, depending on the bit mod or the transfer mode stored in the instruction control register 230, and sends the mask information to the mask register 330.

FIGS. 20(a) and 20(b) illustrate the operation of the embodiment of FIG. 19. Two transfer modes designated by the transfer mode stored in the instruction control register 230 are shown. FIG. 20(a) shows one-pixel transfer mode in which only one-pixel data is transferred at a time. First, a source address (T2H, T2L) is selected, one-word data which contains the source pixel is read from the display memory 13 and it is sent to the barrel shifter 3301 through the read data buffer 3310. On the other hand, the arithmetic logic operation unit 3310 calculates the difference between the low order four bits of the source address and the destination address and the multi-bit shifting is carried out in the barrel shifter 3301 through the shift decoder 2003. The destination address register (DPL, DPH of 3208) is selected, one word of data which contains the destination pixel position is read out and it is sent to the logic operation unit 3305 through the read data buffer 3310. On the other hand, the low order four bits of the destination address is decoded by the interword address decoder 2002, which produces the mask information designating the destination pixel position. The logic operation unit 3305 carries out the substitution operation for the output of the barrel shifter 3301 only for those bit positions of the one-word data of the destination which are designated by the mask information. The operation result is stored in the destination address of the display memory through the write data buffer 3306. By repeating the one-pixel transfer processing while sequentially updating the source address and the destination address, a large volume of data can be transferred at a high speed irrespective of word boundaries of the memory.

FIG. 20(b) illustrates the operation of the multi-pixel transfer mode. The address decoder 2002 sets "1" at a plurality of bit positions designated by the transfer mode bits in the instruction control register 230. Accordingly, a higher speed is attained when a plurality of horizontally continuous bits are transferred.

In accordance with the present embodiment, even when plural-pixel data is stored in one word of the display memory, the pixel data can be transferred to one or more pixel positions by three times of memory access, that is, reading of the source, reading of the destination and writing of the destination. Accordingly, the high speed transfer is attained. One of five operation modes (see FIG. 8) can be selected by the GBM of the register 230.

FIG. 21 illustrates the one-pixel data transfer in the 4 bits/pixel mode. The one-word data which contains the source pixel is read and only the source pixel data thereof is transferred to the destination pixel position. FIG. 22 shows a flow of the transfer processing. One word of the display memory 13 which contains the source pixel is read and temporarily stored in the read data buffer 3310. On the other hand, the difference between the low order four bits of the address information designating the source pixel and the low order four bits of the address information designating the destination pixel is calculated. The difference represents a difference between bit positions of the source pixel and the destination pixel. The source read data is shifted by the barrel shifter 3310 so that the source pixel (Cs) is aligned with the destination pixel position. Then one word which contains the destination pixel (Cd) is read and it is operated with the source pixel (Cs) by the logic operation unit 3305. Since the mask information contains "1" only at the destination pixel position, only one pixel at the destination position is updated and the write data is generated. The logic operation includes replacement and logic operation. In the mode other than the 4 bits/pixel mode, the format of the mask information is different but the operation is similar.

In accordance with the present embodiment, even when one-pixel data is represented by plural bits, the pixel data can be transferred to any pixel position by three times of memory access, that is, reading of the source, reading of the destination and writing of the destination.

FIG. 23 shows the shift direction (SD) of a pointer of a transfer instruction when a rectangular area is designated in the pixel data transfer. Eight examples (a)-(h) are shown. The source area and the destination area can be independently designated.

The operation control which makes the calculation of the pixel position in the transfer easy to implement is explained.

FIG. 24 shows portions of FIG. 2 which relate to the pixel position operation control. The flag register 210 includes a code decoder 2101 and a code register 2102. The flag register 210 further includes an area flag which reflects the operation result, a zero flag and a negative flag, although they are not shown because they are not discussed here. A command code of a command externally transferred through the FIFO 400 is temporarily stored in a command register 3207. A portion of information of the command code is transferred to the microprogram address register 110 so that the microprogram is successively read out and the operation is controlled under the predetermined processing algorithm.

The operation unit 300 carries out the coordinate operation to calculate the current drawing point address and the processing of the graphic pattern data. The code decoder 2101 generates the code data based on the portion of the information of the command code and the information supplied from the other elements in the operation unit 30.

The code register 2102 temporarily stores the code data generated by the code decoder 2101. A mode decoder 2009 arranged in the microinstruction decoder 200 decodes the processing mode field of the command to control the operation.

FIGS. 25(a)-25(e) show formats (CDT) of a copy (transfer) command. It comprises one word (16 bits) of command code and four words of parameters 1-4. By setting the parameter, the scan direction in the transfer can be selected.

FIG. 26 conceptually shows a view of the operation of the copy command. The parameters Xs and Ys are start point coordinate of the source area 13S. The parameters DX and DY define the direction and the size of the area. When DX>0 with Xs and Ys being an origin point, the area is designated rightward, when DX<0, it is designated leftward, when DY>0, it is designated upward and when DY<0, it is designated downward, and the size is designated by the absolute values of DX and DY. An S bit in FIG. 25(a) represents a priority order for scanning. When S="0", the horizontal scan has a higher priority and when S=1, the vertical scan has a higher priority.

In the embodiment of FIG. 24, the first word of the externally transferred command is recognized as the command code and stored in the command register 3207. The processing of a microprogram is started in accordance with the high order four bits of the command code to start to control the copy processing.

The S bit in the command code and the DSD field (FIG. 25) are sent to the code register 2102 through the code decoder 2101 and the low order processing mode field of the command code is decoded by the mode decoder 2009.

The parameters 1-4 are sequentially sent to the register 3102 (not shown) in the operation unit 300. The current drawing point coordinate (X, Y) is stored in the register (CPX, CPY).

FIG. 27(a) shows a configuration of the code register 2102. The code register retains 10-bit information as described below. In FIG. 27(a), the information stored in the registers for the copy command are shown by arrows.

(1) Q1

A first bit is used for switching the coordinate registers X and Y. In the copy command, the first bit is used to determine the priority order for the X direction and Y direction scans in the source area 13S. The S bit of the command code is set as Q1.

When Q1="0", the X register and the Y register are selected as designated, and when Q1="1" the Y register is selected for X designation and the X register is selected for Y designation.

(2) Q2

The second bit is used to switch the coordinate registers X and Y. In the copy command, the second bit is used to switch the X direction and Y direction scans in the designation area 13D. The second bit of the DSD field (FIG. 25) of the command code is set as Q2.

When Q2="0", the X register and the Y register are selected as designated, and when Q2="1", the registers are selected with the reversal of the designation for X and Y.

(3) S1x

Those bits compromise a two-bits information which encodes an operation code in the first X direction. Normally, the higher order bit of the two bits selects addition or subtraction and the lower order bit determines whether the addition/subtraction is to be carried out (when the bit is "1") or not (when the bit is "0").

In the copy command, the code of the parameter DX is set as the higher order bit, and "1" is set as the lower order bit. The higher order bit is used as the information to designate the operation code in the X direction of the source area 13S.

(4) S1y

These bits comprise two-bits information which encode the operation code in the first Y direction like S1x, it is used to select the operation.

In the copy command, the code of the parameter DY and "1" are set into the high order bit and the low order bit, respectively, to designate the operation code in the Y direction of the source area 13S.

(5) S2x

These bits comprise two-bits of information which encode the operation code in the second X direction. In the copy command, these bits designate the operation code in the X direction in the destination area 13D. The bit 1 of the DSD field of the command is set in the higher order bit and "1" is set into the lower order bit.

(6) S2y

These bits comprise two bits information which encode the operation code in the second Y direction. In the copy command, these bits designate the operation code in the Y direction of the destination area 13D. The bit 0 of the DSD field of the command is set into the higher order bit and "1" is set into the lower order bit.

In summary, S1x, S1y, S2x and S2y each can assume four states, and when it is "00" and "10", 0 is added or subtracted (that is, no operation), when it is "01", 1 is added and when it is "11", 1 is subtracted.

In the copy command, the lower order bit of each of the registers S1x, S1y, S2x and S2y of the code register 2102 is "1" as described above. In other command, this bit may be changed.

FIG. 28 shows a processing flow of the copy command. Contents for designating the registers are shown below.

(1) Xs (Q1)

When Q1="0", the Xs register is designated, and when Q1="1", the Ys register is designated. It is a coordinate in the first or priority scan direction of the source area 13S.

(2) Ys (Q1)

When Q1="0", the Ys register is designated, and when Q1="1", the Xs register is designated. It is a coordinate in the second scan direction of the source area 13S.

(3) X(Q2)

When Q2="0", the X register is designated, and when Q2="1", the Y register is designated. It is a coordinate in the first or priority scan direction of the destination region 13D.

(4) Y(Q2)

When Q2="0", the Y register is designated and when Q2="1", the X register is designated. It is a coordinate in the second scan direction of the destination area 13D.

(5) S1x (Q1)

When Q1="0", S1x is selected and when Q1="1", S1y is selected. It is a code of the first (priority) scan direction of the source area 13S.

(6) S1y (Q1)

When Q1="0", S1y is selected and when Q1="1", S1x is selected. It is a code of the second scan direction of the source area 13S.

(7) S2x (Q2)

When Q2="0", S2x is selected and when Q2="1", S2y is selected. It is a code of the first (priority) scan direction of the destination area 13D.

(8) S2y (Q2)

When Q2="0", S2y is selected and when Q2="1", S2x is selected. It is a code of the second scan direction of the destination area 13D.

Referring to FIG. 28, in the copy command, the parameters 1-4 following to the command code, that is, Xs, Ys, DX and DY are sequentially supplied and stored in the registers in the operation unit 300 (step S1).

Then, one line in the first (priority) scan direction is processed. To this end, Xs (Q1) and X (Q2), that is, the start coordinates of the source area 13S and the destination area 13D in the first (priority) scan direction are buffered into other register (step S2).

Then, the pixel information at the coordinate designated by (Xs, Ys) is transferred to the coordinate designated by (X, Y) (step S3). The one-pixel transfer processing has been described before.

Then, the codes S1x (Q1) and S2x (Q2) are added to the coordinates Xs (Q1) and X (Q2) in the first scan direction of the source area 13S and the destination area 13D. Namely, the designated coordinate points of the respective areas are shifted by one pixel in the first scan direction (step S4).

The steps S3 and S4 are repeated until the designated coordinate point reaches the end point of one line (step S5).

At the end of one line processing, if the decision in the step S5 is affirmative, Xs (Q1) and X (Q2) are reset (step S6) and the codes S1y (Q1) and S2y (Q2) are added to the second scan direction coordinates Ys (Q1) and Y (Q2) and the start point coordinate of the second line is set (step S7).

The steps S2-S7 are repeated until the line processing in the second scan direction is completed, that is, until the decision in the step S8 is affirmative so that all data of the source area 13S are transferred.

In accordance with the present embodiment, various pointer scan modes in the area data transfer can be attained by the single process flow shown in FIG. 28 so that the control information (for example, microprogram) can be significantly reduced or simplified.

The present invention can be equally applied to other command or pattern command.

FIGS. 27(b) and 27(c) show formats of the pattern command. It comprises one 16-bit word command code and one-word parameter.

The pattern command is used to develop the pattern information stored in the pattern memory in the graphic pattern processing apparatus onto the display memory. By selecting the operation mode of the command, various scans can be carried out by the pointer.

We claim:

1. A graphic data processing apparatus for accessing memory means which stores pixels where each of said pixels is a picture element of a unique point in two-dimensional space and having a number of bits which may be selected in the memory means and for generating graphic data, with two or more bits per pixel being used, and a plurality of pixels of data being stored in one word of said memory means, comprising:

a physical address operation unit having means for storing information of a current drawing point including a memory address of a word in said memory means and a pixel address defining a position of a pixel in one word specified by the memory address; and a data operation unit having means for modifying a particular pixel having a number of bits which may be selected in the one word specified by the pixel address in accordance with a drawing instruction.

2. A graphic data processing apparatus for accessing memory means which stores pixels where each of said pixels is a picture element of a unique point in two-dimensional space and having a number of bits which may be selected in the memory means and for generating graphic data, with two or more bits per pixel being used, and a plurality of pixels of data being stored in one word of said memory means, comprising:

a physical address operation unit having means for storing information of a current drawing point including a memory address of a word in said memory means and a pixel address defining a position of a pixel in the word specified by the memory address;

a data operation unit having means for modifying a particular pixel having a number of bits which may be selected in the word specified by the pixel address in accordance with a drawing instruction;

a control unit for controlling a drawing function by decoding a drawing instruction applied thereto;

an instruction memory means for providing at least drawing instructions applied to said control unit;

a memory for storing said graphic pattern data; and information output means for outputting an image of said graphic pattern data stored in said memory.

3. A graphic data generating apparatus comprising:

an information output means for outputting an image of graphic pattern data;

a memory means for storing pixels where each of said pixels is a picture element of a unique point in two-dimensional space of graphic pattern data to be provided to said information output means; and a graphic data processing apparatus including;

a writing means for writing a plurality of pixels of data into an address of said memory means, each of said pixels having at least one bit; and a control means for specifying a variable number of the at least one bit in each of the pixels of data to be written into the address of said memory means.

4. A graphic data generating apparatus in accordance with claim 3 further comprising:

means for modifying the pixels of data to be written into the address of said memory means.

5. A graphic data generating apparatus in accordance with claim 3 wherein:

the control means specifies information regarding content of words each containing a plurality of pixels stored in the memory means.

6. A graphic data generating apparatus comprising:

an information output means for outputting an image of graphic pattern data;

a memory means for storing pixels where each of said pixels is a picture element of a unique point in two-dimensional space of graphic pattern data to be provided to said information output means; and a graphic data processor including a writing means for writing at least one pixel of data within a word location of the at least one pixel identified by a memory address in the memory means, and within at least one pixel position of the at least one pixel identified by a pixel address in the word location in the memory means, said pixel having at least one bit; and a control means for specifying a variable number of the at least one bit in the pixel of data to be written within the word location and pixel address in the word location.

7. A graphic data generating apparatus comprising:

an information output means for outputting an image of graphic pattern data;

a memory means for storing pixels where each of said pixels is a picture element of a unique point in two-dimensional space of graphic pattern data to be provided to said information output means;

a writing means for writing at least one pixel of data into a word address of said memory means, each of said at least one pixel of data having at least one bit; and a control means for specifying a variable number of pixels of data to be written into the word address of said memory means.

8. A graphic data generating apparatus comprising:

an information output means for outputting an image of graphic pattern data;

a memory means for storing pixels where each of said pixels is a picture element of a unique point in two-dimensional space of graphic pattern data to be provided to said information output means; and a graphic data processing apparatus including a writing means for writing a plurality of pixels of data into an address of said memory means, each of said pixels having a variable number of bits within a word which may be selected.

9. A method of operating a graphic generating apparatus comprising:

outputting an image of graphic pattern data;

storing at least one pixel where a pixel is a picture element of a unique point in two-dimensional space of graphic pattern data in an address to be provided in the outputting of the image of graphic pattern data;

specifying a variable number of bits of data within at least one pixel which is stored in the address; and writing at least one pixel of data into the word with the number of bits within the at least one pixel being the specified number.

* * * * *